(12) United States Patent
Koga et al.

(10) Patent No.: US 10,623,448 B2
(45) Date of Patent: Apr. 14, 2020

(54) AUDIO DATA TRANSFER DEVICE AND AUDIO DATA TRANSFER METHOD

(71) Applicant: FUJITSU LIMITED, Kawasaki-shi, Kanagawa (JP)

(72) Inventors: Susumu Koga, Kawasaki (JP); Keisuke Saito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 281 days.

(21) Appl. No.: 15/728,773

(22) Filed: Oct. 10, 2017

(65) Prior Publication Data

US 2018/0115589 A1    Apr. 26, 2018

(30) Foreign Application Priority Data

Oct. 21, 2016    (JP) ................. 2016-206890

(51) Int. Cl.
  *H04L 29/06*    (2006.01)
  *H04L 29/08*    (2006.01)

(52) U.S. Cl.
  CPC ...... *H04L 65/1059* (2013.01); *H04L 65/4038* (2013.01); *H04L 29/06* (2013.01); *H04L 29/08* (2013.01)

(58) Field of Classification Search
  None
  See application file for complete search history.

(56) References Cited

U.S. PATENT DOCUMENTS

| 2007/0121865 A1 | 5/2007 | Jachner |
| 2009/0147958 A1* | 6/2009 | Calcaterra ............ H04L 9/0822 380/260 |
| 2015/0135098 A1 | 5/2015 | Geppert et al. |

FOREIGN PATENT DOCUMENTS

| JP | 2007-143144 A | 6/2007 |
| JP | 2011-40036 A | 2/2011 |

* cited by examiner

*Primary Examiner* — James A Edwards
(74) *Attorney, Agent, or Firm* — Westerman, Hattori, Daniels & Adrian, LLP

(57) ABSTRACT

An audio data transfer device includes a processor configured to generate primary transfer paths for transmitting audio data between the audio data transfer device and a plurality of terminals, respectively. The processor is configured to transfer, upon receiving audio data from one terminal of the plurality of terminals, the received audio data to the plurality of terminals other than the one terminal through the primary transfer paths. The processor is configured to receive first key information for identifying a second terminal of the plurality of terminals from a first terminal of the plurality of terminals. The second terminal is different from the first terminal. The processor is configured to suppress transfer of first audio data to the first terminal upon receiving the first audio data from a third terminal of the plurality of terminals. The third terminal is different from the first terminal and the second terminal.

9 Claims, 15 Drawing Sheets

| DATA-BLOCKING MANAGEMENT TABLE ||||
|---|---|---|---|
| GROUP ID | COMMUNICATION ID | USER ID | BLOCKING FLAG |
| 1 | 1 | 2 | true |
| | 2 | 3 | false |

AUDIO DATA TRANSFER DEVICE AND AUDIO DATA TRANSFER METHOD

CROSS-REFERENCE TO RELATED APPLICATION

This application is based upon and claims the benefit of priority of the prior Japanese Patent Application No. 2016-206890, filed on Oct. 21, 2016, the entire contents of which are incorporated herein by reference.

FIELD

The embodiments discussed herein are related to an audio data transfer device and an audio data transfer method.

BACKGROUND

Currently, a system which supports a teleconference in which a plurality of users participate is utilized. For example, a system which displays images illustrating communication sessions between users participating in a teleconference on a graphical user interface (GUI) is suggested. Upon receiving an input of a contact destination by one of the users, the system dials a phone number of the contact destination, and adds an image illustrating a communication session corresponding to a user of the contact destination on the GUI.

There is also a call server which provides a feature called an enhanced whisper feature that enables a user telephonic device to simultaneously participate in different telephonic communication sessions while isolating audible input of the user between the telephonic communication sessions.

Related techniques are disclosed in, for example, Japanese Laid-open Patent Publication No. 2011-40036 and Japanese Laid-open Patent Publication No. 2007-143144.

For example, using a transfer device which transfers audio data, which is transmitted from a terminal, to another terminal, discussion by a plurality of users respectively using the terminals may be realized by outputting audio data of a voice emitted by a user of a terminal at other terminals.

While more than two users participate in a discussion, there is a case where a first user wants to attentively listen to a voice of a second user. However, when all pieces of audible input at the other terminals are output at a terminal which the first user uses, the first user may hear not only the voice of the second user but also voices of users other than the second user. For this reason, there is a problem that audio perceptibility of the voice of the second user for the first user decreases.

SUMMARY

According to an aspect of the present invention, provided is an audio data transfer device including a memory and a processor coupled to the memory. The processor is configured to generate primary transfer paths for transmitting audio data between the audio data transfer device and a plurality of terminals, respectively. The processor is configured to transfer, upon receiving audio data from one terminal of the plurality of terminals, the received audio data to the plurality of terminals other than the one terminal through the primary transfer paths. The processor is configured to receive first key information for identifying a second terminal of the plurality of terminals from a first terminal of the plurality of terminals. The second terminal is different from the first terminal. The processor is configured to suppress transfer of first audio data to the first terminal upon receiving the first audio data from a third terminal of the plurality of terminals. The third terminal is different from the first terminal. The third terminal is different from the second terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, the embodiments will be described with reference to drawings.

First Embodiment

Figure 1:
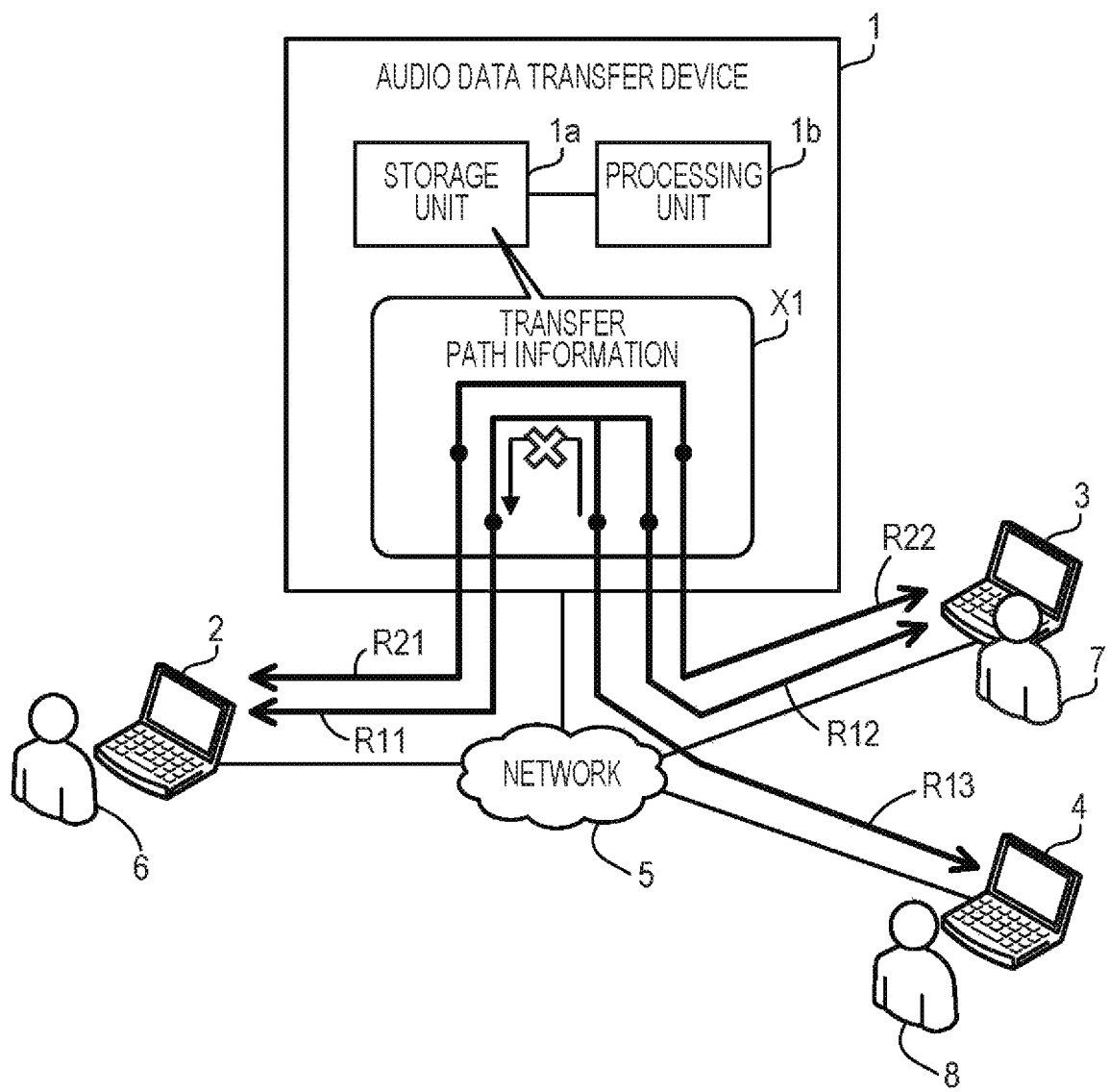
FIG. 1 is a diagram illustrating an audio data transfer device according to a first embodiment.

FIG. 1 is a diagram illustrating an audio data transfer device according to a first embodiment. An audio data transfer device 1 and terminals 2, 3, and 4 are coupled to a network 5. The audio data transfer device 1 transfers audio data between the terminals 2, 3, and 4. A user 6 uses the terminal 2. A user 7 uses the terminal 3. A user 8 uses the terminal 4. The terminal 2 includes a microphone and a speaker. The microphone and the speaker may be externally attached to the terminal 2 or may be mounted on the terminal 2. The terminals 3 and 4 also include a microphone and a speaker similarly to the terminal 2. The user 6 uses the microphone coupled to the terminal 2 to input a voice emitted by the user 6 at the terminal 2. The user 6 uses the speaker coupled to the terminal 2 to hear voices emitted by the users 7 and 8. The terminals 2, 3, and 4 are, for example, a smartphone, a tablet terminal, or a client computer such as a personal computer (PC).

The audio data transfer device 1 includes a storage unit 1a and a processing unit 1b. The storage unit 1a may be a volatile storage device such as a random access memory (RAM) or may be a nonvolatile storage device such as a hard disk drive (HDD) or a flash memory. The processing unit 1b may include a central processing unit (CPU), a digital signal processor (DSP), an application specific integrated circuit (ASIC), a field programmable gate array (FPGA), and the like. The processing unit 1b may be a processor which executes a program. The processor may be a group (multi-processor) of a plurality of processors.

The storage unit 1a stores transfer path information X1. The transfer path information X1 is information for managing a transfer path (referred to as an audio data transfer path) of audio data between each of the terminals 2, 3, and 4 and the audio data transfer device 1. The transfer path of the audio data is generated for each pair of the audio data transfer device 1 and a terminal (here, one of the terminals 2, 3, and 4). The transfer path information X1 includes information indicating a correspondence between, for example, identification information of the transfer path and identification information of the terminal.

The processing unit 1b registers information related to a new transfer path to the transfer path information X1 to generate an audio data transfer path. For example, the processing unit 1b generates transfer paths R11, R12, and R13 of audio data so that the users 6, 7, and 8 may talk with each other using the terminals 2, 3, and 4.

The transfer path R11 is an audio data transfer path between the audio data transfer device 1 and the terminal 2. The transfer path R12 is an audio data transfer path between the audio data transfer device 1 and the terminal 3. The transfer path R13 is an audio data transfer path between the audio data transfer device 1 and the terminal 4. The processing unit 1b associates the transfer paths R11, R12, and R13 with a first group in which transfer (audio data transfer) of audio data is permitted to each other. The processing unit 1b receives audio data through one transfer path among the transfer paths R11, R12, and R13, and transfers the received audio data through the other two transfer paths.

In the audio data transferred by the processing unit 1b, audio data of voices emitted by a plurality of users may be mixed. On the other hand, for example, the user 6 may want to attentively listen to a voice emitted by the user 7. However, if a voice output at the terminal 2 includes voices of the users 7 and 8, audio perceptibility of the voice of the user 7 may be decreased for the user 6. Therefore, the processing unit 1b provides a function for suppressing a decrease of audio perceptibility.

Upon receiving identification information of a second terminal from a first terminal, the processing unit 1b respectively generates a new audio data transfer path between the first terminal and the own device (audio data transfer device 1), and between the second terminal and the own device.

For example, when the user 6 wants to listen to a voice of the user 7, the user 6 inputs identification information of the terminal 3 at the terminal 2. Predetermined identification information such as identification information of a user associated with the terminal 3 may be regarded as identification information of the terminal 3. The terminal 2 transmits the identification information of the terminal 3 to the audio data transfer device 1.

Upon receiving the identification information of the terminal 3 from the terminal 2, the processing unit 1b generates new transfer paths R21 and R22 of audio data between the terminal 2 and the audio data transfer device 1, and between the terminal 3 and the audio data transfer device 1, respectively. The transfer path R21 is an audio data transfer path between the terminal 2 and the audio data transfer device 1. The transfer path R22 is an audio data transfer path between the terminal 3 and the audio data transfer device 1. The processing unit 1b associates the transfer paths R21 and R22 with a second group (may be considered as a subgroup of the first group) in which audio data transfer is permitted to each other.

The processing unit 1b perform audio data transfer between the first terminal and the second terminal through the newly generated transfer paths of the audio data. At the same time, the processing unit 1b suppresses audio data transfer between the first terminal and the other terminals through the transfer path of the audio data generated in the first group between the first terminal and the own device and the transfer paths of the audio data generated in the first group between the own device and other terminals different from the second terminal.

For example, the processing unit 1b performs audio data transfer between the terminal 2 and the terminal 3 through the newly generated transfer paths R21 and R22 of audio data. At the same time, the processing unit 1b suppresses audio data transfer between the terminal 2 and the terminal 4 through the transfer path R11 and the transfer path R13. Specifically, the processing unit 1b suppresses audio data transfer from the terminal 4 to the terminal 2. As a result, at the terminal 2, a voice of the user 7 is output, but voices of users (for example, the user 8) other than the user 7 are not output. At this time, the processing unit 1b may suppress audio data transfer from the terminal 2 to the terminal 4. In addition, (since audio data transfer between the terminal 2 and the terminal 3 is performed through the transfer paths R21 and R22) the processing unit 1b may suppress audio data transfer between the terminal 2 and the terminal 3 through the transfer paths R11 and R12.

Other methods may be considered in which the terminal 2 does not output voices of users other than a predetermined user. For example, as a first method, it is conceivable to stop a function of the microphone of the terminal 4. This is because audible input of the user 8 at the terminal 4 may be blocked. However, when a voice of the user 8 is no longer input at the terminal 4, voice communication between the users 7 and 8 is unable to be performed.

As a second method, it is conceivable to stop a function of the speaker of the terminal 2. This is because audible output of a voice of the user 8 at the terminal 2 may be blocked. However, in this case, not only the audible output of the voice of the user 8 but also audible output of a voice of the user 7 that is desired by the user 6 is blocked.

The audio data transfer device 1 newly generates transfer paths R21 and R22 between the audio data transfer device 1 and each of the terminals 2 and 3 in addition to the existing transfer paths R11, R12, and R13, and suppresses audio data transfer between the terminal 2 and the terminal 4 through the transfer paths R11 and R13.

Accordingly, audio data transferred to the terminal 2 may be limited to the audio data of a voice of the user 7 input at the terminal 3 while maintaining voice communication between the users 7 and 8. For this reason, the voice output at the terminal 2 includes the voice of the user 7, but does not include voices of other users (for example, the user 8). Therefore, the user 6 may easily perceive the voice of the user 7 (audio perceptibility may be improved). In this manner, the audio data transfer device 1 may suppress the decrease of audio perceptibility by outputting voices received from a plurality of terminals. In addition, this manner does not affect voice communication between other users (for example, the users 7 and 8) other than the user 6.

Further, in the audio data transfer device 1, it is also conceivable to synthesize the audio data received through both of the transfer paths R12 and R13 in a certain time zone and transfer the synthesized audio data through the transfer path R11. In this case, audio data of voices emitted by the users 7 and 8 is mixed in the synthesized audio data, and it may be difficult to separate the audio data of each of the users on a terminal side. On a terminal 2 side, since a terminal serving as an input source of the audio data is unable to be identified, it may be difficult, on the terminal 2 side, to determine audio data for which audible output is to be suppressed. On the other hand, the audio data transfer device 1 according to the first embodiment determines, before audio data is transferred from the audio data transfer device 1 to the terminal 2, whether or not audio data transfer is to be suppressed. For this reason, even in a case where it is difficult to separate the audio data of each of the users and audio data for which audible output is to be suppressed is unable to be distinguished on the terminal 2, there is an advantage that audible output at the terminal 2 may be limited to the voice of the user 7 input at the terminal 3.

After individual communication is started by the terminals 2 and 3, the processing unit 1b may further permit another terminal to participate in the individual communication. For example, a case where another terminal (hereinafter, referred to as "other terminal") other than the terminals 2, 3, and 4 is coupled to the network 5, is considered. After audio data transfer between the terminal 2 and the terminal 3 is started through the transfer paths R21 and R22, the processing unit 1b generates a transfer path of additional audio data between the other terminal and the audio data transfer device 1 upon receiving identification information of the other terminal from the terminal 2. Then, the processing unit 1b performs audio data transfer between the terminal 2, the terminal 3, and the other terminal through the generated additional transfer path of the audio data in addition to the transfer paths R21 and R22. At the same time, the processing unit 1b suppresses audio data transfer between the terminal 2 and the terminal 4 different from the terminal 2, the terminal 3, and the other terminal.

In this way, the processing unit 1b may dynamically update a terminal group performing individual communication among the plurality of terminals in accordance with an instruction from the terminal 2. In this manner, a user (member of the subgroup) whom the user 6 wants to listen to may be added after the individual communication is started.

Hereinafter, an example in which the audio data transfer device 1 is applied to a remote support system and functions of the audio data transfer device 1 will be further specifically described.

Second Embodiment

Figure 2:
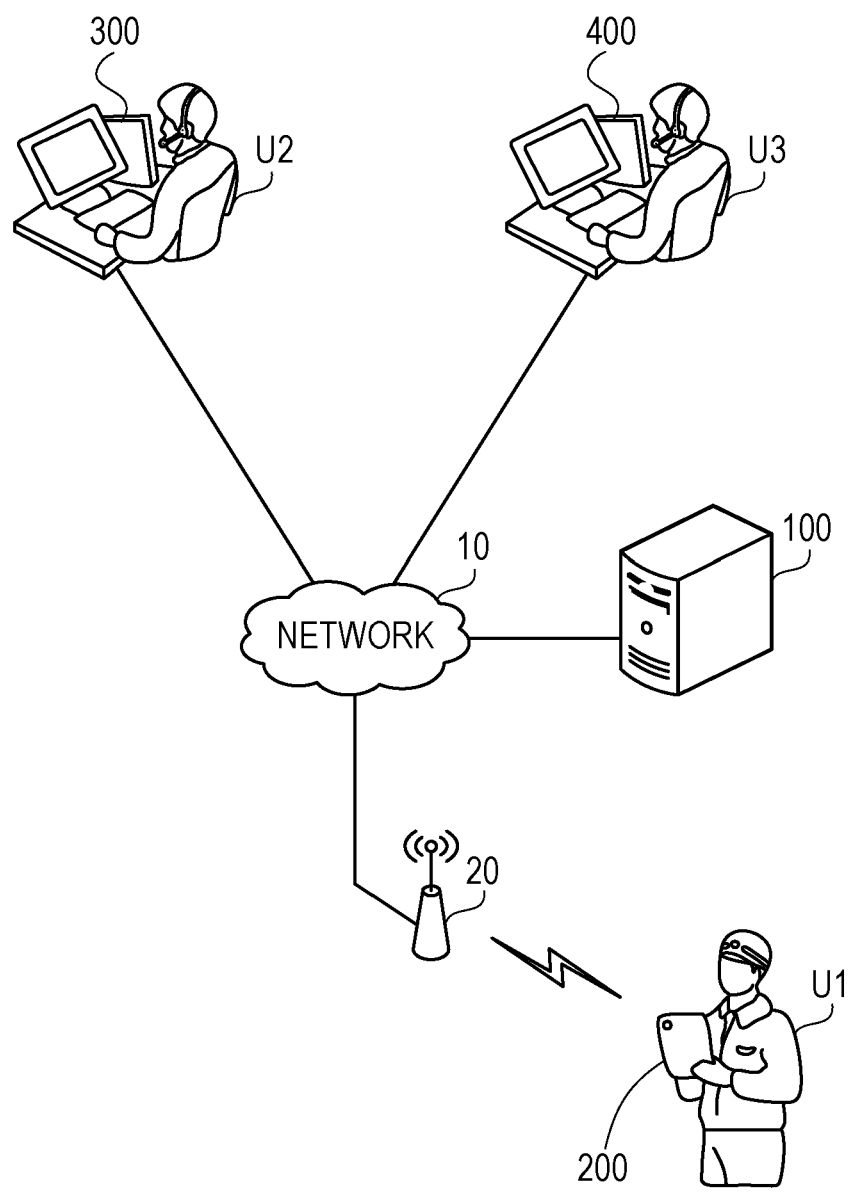
FIG. 2 is a diagram illustrating a remote support system according to a second embodiment.

FIG. 2 is a diagram illustrating a remote support system according to a second embodiment. The remote support system according to the second embodiment is used for remote support by supporters U2 and U3 for a worker U1 who works at the workplace. The remote support system according to the second embodiment includes a server 100, an operation terminal 200, and support terminals 300 and 400. The server 100 and the support terminals 300 and 400 are coupled to a network 10. The network 10 may be a local area network (LAN), a wide area network (WAN), the internet, or the like.

In addition, an access point 20 is coupled to the network 10. The access point 20 may be a wireless LAN access point or a wireless base station relaying mobile communication. The operation terminal 200 is coupled to the network 10 via the access point 20.

The server 100 is a server computer which transfers audio data between the operation terminal 200 and the support terminals 300 and 400. The server 100 is an example of the audio data transfer device 1 according to the first embodiment.

The operation terminal 200 is a client computer used by the worker U1. For example, the operation terminal 200 is a tablet terminal. The operation terminal 200 is an example of the terminals 2, 3, and 4 according to the first embodiment.

The support terminals 300 and 400 are client computers used by the supporters U2 and U3. For example, each of the support terminals 300 and 400 is a PC. The support terminals 300 and 400 are examples of the terminals 2, 3, and 4 according to the first embodiment.

In the remote support system according to the second embodiment, the server 100 realizes bidirectional communication (teleconference in which three persons participate) by the three persons of the worker U1 and the supporters U2 and U3 using the operation terminal 200 and the support terminals 300 and 400, respectively. A voice conversation and sharing of information such as images and characters may be performed between the operation terminal 200 and the support terminals 300 and 400. For example, the worker U1 may obtain advice on work at the workplace from both of the supporters U2 and U3. In addition, the supporters U2 and U3 may consult with each other to give advice to the worker U1. The number of persons participating in the conference may be more than 3 (the number of terminals may be more than 3).

Figure 3:
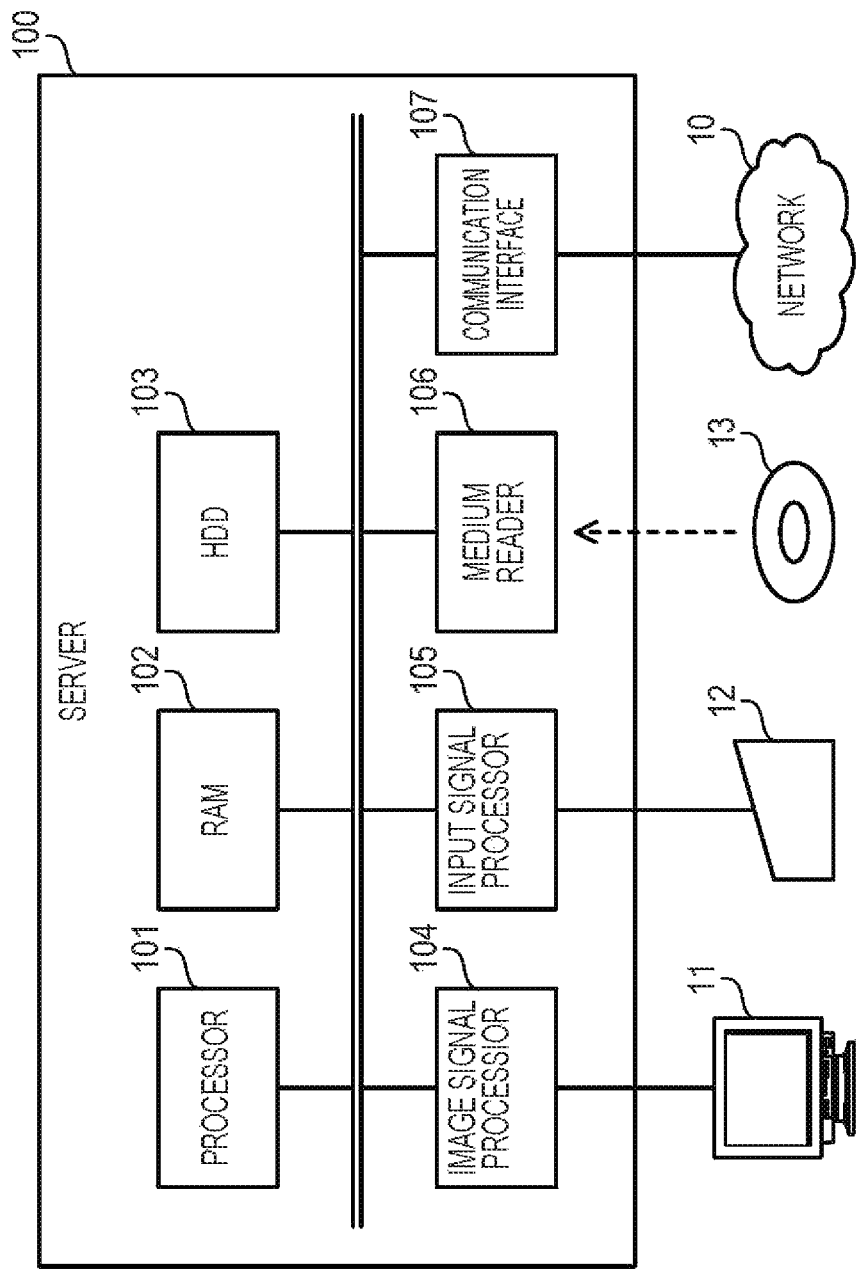
FIG. 3 is a diagram illustrating an exemplary hardware configuration of a server according to a second embodiment.

FIG. 3 is a diagram illustrating an exemplary hardware configuration of a server according to the second embodiment. The server 100 includes a processor 101, a RAM 102, an HDD 103, an image signal processor 104, an input signal processor 105, a medium reader 106, and a communication interface 107. Each hardware component is coupled to a bus of the server 100.

The processor 101 controls information processing of the server 100. The processor 101 may be a multiprocessor. The processor 101 is, for example, a CPU, a DSP, an ASIC, an FPGA, or the like. The processor 101 may be a combination of two or more elements among the CPU, the DSP, the ASIC, the FPGA, and the like.

The RAM 102 is a main memory unit of the server 100. The RAM 102 temporarily stores therein at least a part of an operating system (OS) program and an application program to be executed by the processor 101. The RAM 102 also stores various types of data used for processing performed by the processor 101.

The HDD 103 is an auxiliary memory unit of the server 100. The HDD 103 magnetically writes and reads data to and from a mounted magnetic disk. The HDD 103 stores therein the OS program, the application program, and various types of data. The server 100 may include another type of an auxiliary memory unit such as a flash memory or a solid state drive (SSD), or may include a plurality of auxiliary memory units.

The image signal processor 104 outputs an image on a display 11 coupled to the server 100 in accordance with a command from the processor 101. As the display 11, a cathode ray tube (CRT) display, a liquid crystal display, or the like may be used.

The input signal processor 105 obtains an input signal from an input device 12 coupled to the server 100, and outputs the input signal to the processor 101. As the input device 12, for example, a pointing device such as a mouse or a touch panel, a keyboard, or the like may be used.

The medium reader 106 is a device which reads a program or data recorded in a recording medium 13. As the recording medium 13, for example, a magnetic disk such as a flexible disk (FD) or an HDD, an optical disk such as a compact disc (CD) or a digital versatile disc (DVD), a magneto-optical disk (MO) may be used. Further, as the recording medium 13, for example, a nonvolatile semiconductor memory such as a flash memory card may be used. For example, the medium reader 106 stores the program or the data read from the recording medium 13 in the RAM 102 or the HDD 103 in accordance with a command from the processor 101.

The communication interface 107 communicates with other devices over the network 10. The communication interface 107 may be a wired communication interface or may be a wireless communication interface.

The support terminals 300 and 400 may also be realized using similar hardware as the server 100. Each of the support terminals 300 and 400 is coupled to a microphone and a speaker (alternatively, a headset including a microphone and a speaker), and includes a connection interface which receives an input of an audio signal by the microphone or outputs an audio signal to the speaker.

Figure 4:
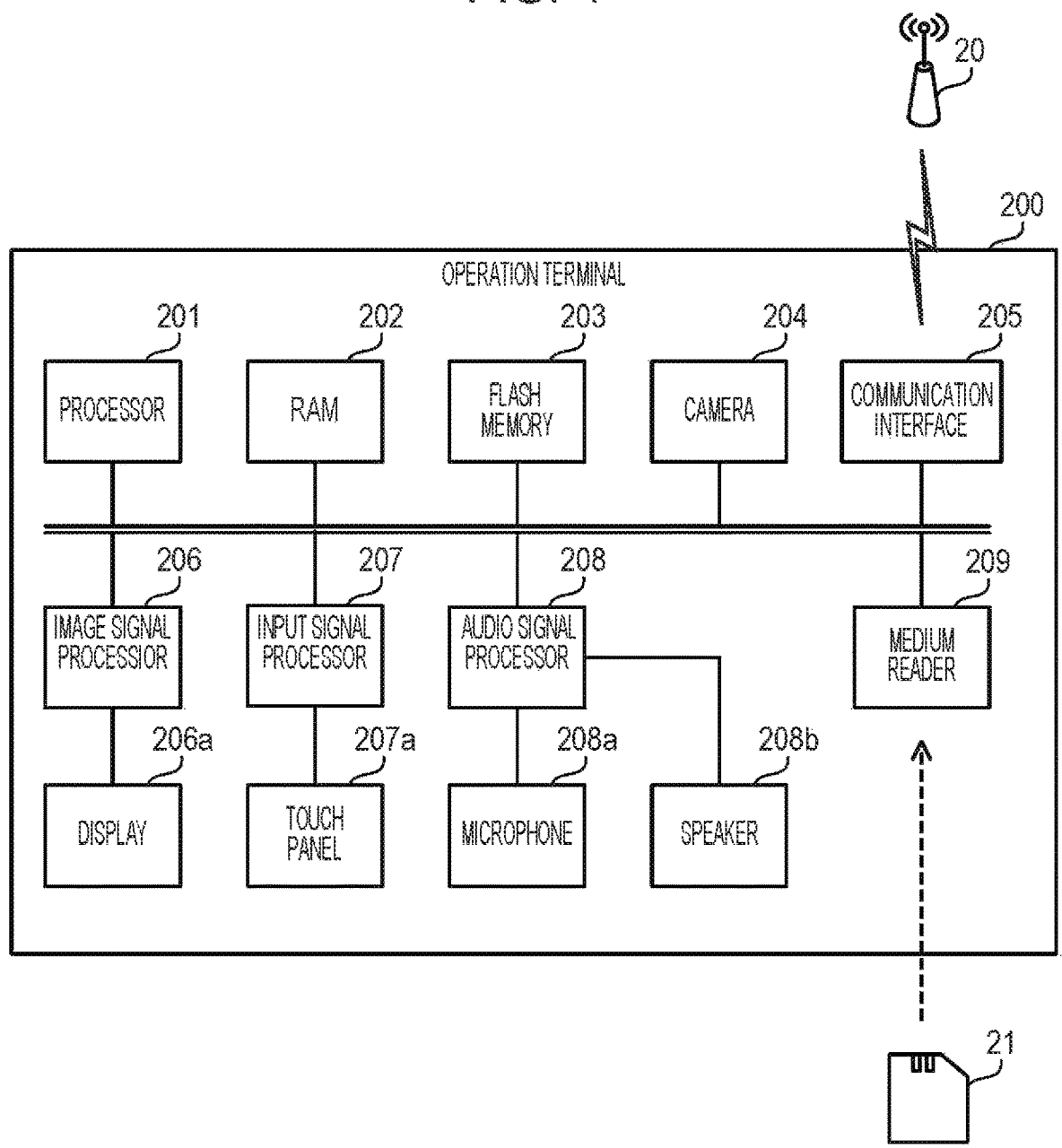
FIG. 4 is a diagram illustrating an exemplary hardware configuration of an operation terminal according to a second embodiment.

FIG. 4 is a diagram illustrating an exemplary hardware configuration of the operation terminal according to the second embodiment. The operation terminal 200 includes a processor 201, a RAM 202, a flash memory 203, a camera 204, a communication interface 205, an image signal processor 206, a display 206a, an input signal processor 207, a touch panel 207a, an audio signal processor 208, a microphone 208a, a speaker 208b, and a medium reader 209. Each hardware component is coupled to a bus of the operation terminal 200.

The processor 201 controls information processing of the operation terminal 200. The processor 201 may be a multi-processor. The processor 201 is, for example, a CPU, a DSP, an ASIC, an FPGA, or the like. The processor 201 may be a combination of two or more elements among the CPU, the DSP, the ASIC, the FPGA, and the like.

The RAM 202 is a main memory unit of the operation terminal 200. The RAM 202 temporarily stores therein at least a part of an OS program and an application program to be executed by the processor 201. In addition, the RAM 202 stores therein various types of data used for processing performed by the processor 201.

The flash memory 203 is an auxiliary memory unit of the operation terminal 200. The flash memory 203 stores therein the OS program, the application program, and various types of data.

The camera 204 is an imaging device mounted on the operation terminal 200. The camera 204 includes an imaging element such as a charge-coupled device (CCD), a complementary metal oxide semiconductor (CMOS), or the like. The camera 204 generates still image data or moving image data of a scene in a direction toward which the lens of the camera 204 is oriented in accordance with a command from the processor 201.

The communication interface 205 is a wireless communication interface which establishes a wireless link with the access point 20, and communicates with other devices including the server 100 via the access point 20 and the network 10. The communication interface 205 may be a wired communication interface which is coupled in wired to the network 10 without going via the access point 20.

The image signal processor 206 outputs an image on a display 206a in accordance with a command from the processor 201. For example, a liquid crystal display may be used for the display 206a.

The input signal processor 207 obtains an input signal from the touch panel 207a, and outputs the input signal to the processor 201. The touch panel 207a is a pointing device which outputs information indicating a position touched by a user to the processor 201. The touch panel 207a is provided so as to overlap with a display area of the display 206a. The user may perform a touch operation using the touch panel 207a while checking a display using the display 206a.

The audio signal processor 208 converts an analog audio signal input from the microphone 208a into a digital audio signal, and outputs the digital audio signal to the processor 201. The microphone 208a detects sounds around the microphone 208a, generates an analog audio signal, and outputs the analog audio signal to the audio signal processor 208. The audio signal processor 208 converts a digital audio signal input from the processor 201 into an analog audio signal, and outputs the analog audio signal to the speaker 208b. The speaker 208b outputs a sound in response to the analog audio signal input by the audio signal processor 208.

The medium reader 209 is a device which reads a program or data recorded in a recording medium 21. As the recording medium 21, for example, a flash memory card may be used. For example, the medium reader 209 stores the program or the data read from the recording medium 21 in the RAM 202 or the flash memory 203 in accordance with a command from the processor 201.

Figure 5:
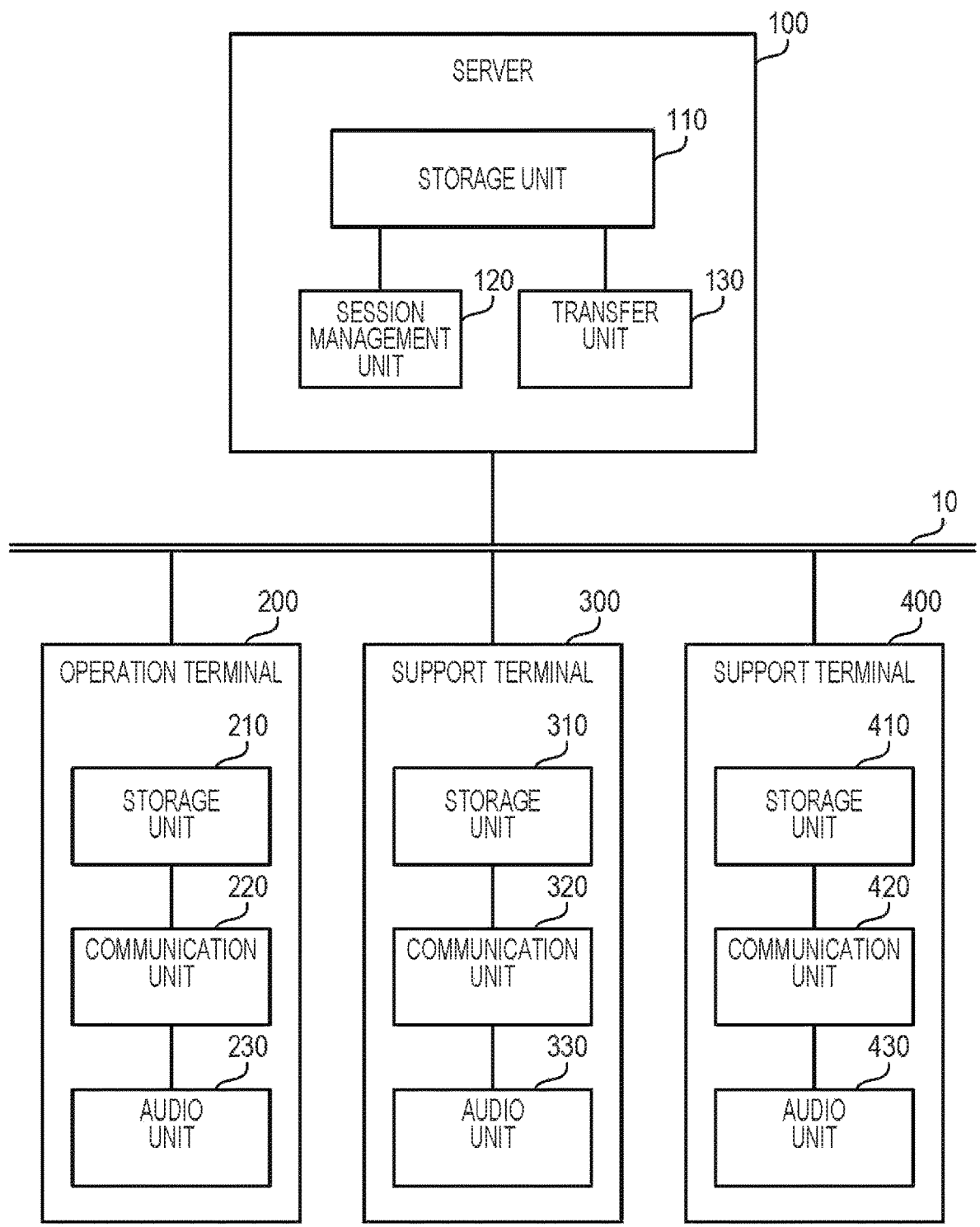
FIG. 5 is a diagram illustrating an exemplary functional configuration of a remote support system according to a second embodiment.

FIG. 5 is a diagram illustrating an exemplary functional configuration of the remote support system according to the second embodiment. The server 100 includes a storage unit 110, a session management unit 120, and a transfer unit 130. The storage unit 110 is realized using a storage area secured in the RAM 102 or the HDD 103. The session management unit 120 and the transfer unit 130 are realized by the processor 101, by executing the program stored in the RAM 102.

The storage unit 110 stores therein session management information. A session is information corresponding to an audio data transfer path, and is identified by a session identifier (ID). The session is generated for a pair of the server 100 and a terminal. A combination of sessions belongs to one group (a group of users participating in a teleconference). Audio data transfer is permitted between terminals using sessions belonging to the same group.

The session management unit 120 manages sessions. For example, the session management unit 120 adds a new session to a group of users. The session management unit 120 deletes an existing session from the group. In addition, the session management unit 120 deletes the group. The session management unit 120 updates the session management information stored in the storage unit 110 in response to generation or deletion of a group or a session.

In addition to a session for voice communication, for example, a session for sending character strings and a session for sharing files such as images are also included in "sessions" for communication used in the remote support system. However, in the present embodiment, it is assumed that the "session" indicates a session for voice communication.

The session management unit 120 also manages individual communication between the terminals. The individual communication is a function of transferring, to a terminal, only audio data sent from a specific terminal (the other party terminal of individual communication) among audio data sent from the plurality of terminals. The session management unit 120 records information indicating a pair of terminals performing individual communication and a terminal of a requester of the individual communication in the storage unit 110, for a group under the voice communication.

Based on the session management information stored in the storage unit 110, the transfer unit 130 determines a transfer destination of audio data received from the operation terminal 200 and the support terminals 300 and 400. The transfer unit 130 transfers the audio data to the determined transfer destination.

In an individual communication among a specific group, the transfer unit 130 transfers audio data, which is limited to the audio data received from the other party terminal of the individual communication, to a terminal of a requester of the individual communication. Further, the transfer unit 130 does not transfer audio data received from terminals other than the other party terminal of the individual communication to the terminal of the requester of the individual communication.

The operation terminal 200 includes a storage unit 210, a communication unit 220, and an audio unit 230. The storage unit 210 is realized using a storage area secured in the RAM 202 or the flash memory 203. The communication unit 220 and the audio unit 230 are realized by executing the program stored in the RAM 202 by the processor 201.

The storage unit 210 stores therein identification information of the operation terminal 200. The identification information of the operation terminal 200 may be a user ID of a user who uses the operation terminal 200 or may be a predetermined address (for example, internet protocol (IP) address) used for communication by the operation terminal 200.

The communication unit 220 communicates with the server 100. The communication unit 220 obtains audio data from the audio unit 230, and transmits the obtained audio data to the server 100. The communication unit 220 receives audio data from the server 100, and provides the received audio data to the audio unit 230.

The audio unit 230 controls an operation of the audio signal processor 208, and provides audio data (digital audio signal) corresponding to audible input from the microphone 208*a* to the communication unit 220. The audio unit 230 obtains audio data from the communication unit 220, controls the operation of the audio signal processor 208 to reproduce a voice corresponding to the obtained audio data using the speaker 208*b*.

The support terminal 300 includes a storage unit 310, a communication unit 320, and an audio unit 330. The support terminal 400 includes a storage unit 410, a communication unit 420, and an audio unit 430. The storage units 310 and 410 store therein identification information of the support terminals 300 and 400, respectively. The communication units 320 and 420 perform functions similar to the functions of the communication unit 220 of the operation terminal 200 in the support terminals 300 and 400, respectively. The audio units 330 and 430 perform functions similar to the functions of the audio unit 230 of the operation terminal 200 in the support terminals 300 and 400, respectively.

Figure 6:
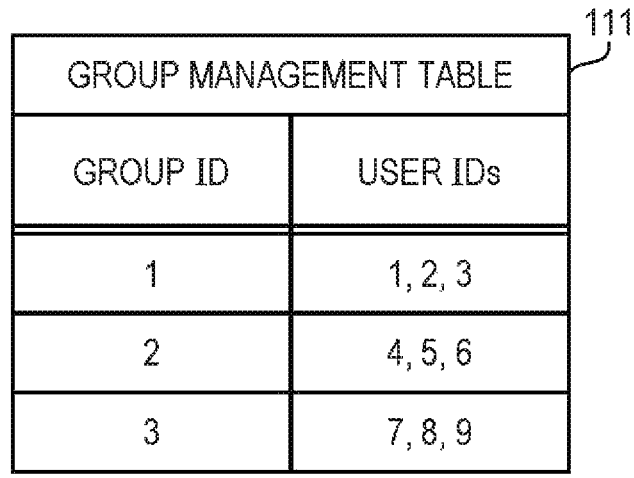
FIG. 6 is a diagram illustrating an example of a group management table according to a second embodiment.

FIG. 6 is a diagram illustrating an example of a group management table according to the second embodiment. A group management table 111 is stored in advance in the storage unit 110. Each record of the group management table 111 includes items of "group ID" and "user IDs".

In the item of "group ID", a group ID (identification information of a group) is registered. In the item of "user IDs", user IDs (identification information of users) of members in the group are registered.

For example, in the group management table 111, a record in which the group ID is "1", and the user IDs are "1", "2", and "3" is registered. This record indicates that three users with the user IDs "1", "2", and "3" belong to the group with the group ID "1".

Here, the user with the user ID "1" is the worker U1. The user with the user ID "2" is the supporter U2. The user with the user ID "3" is the supporter U3. In the group management table 111, records related to other groups may be registered similarly.

Figure 7:
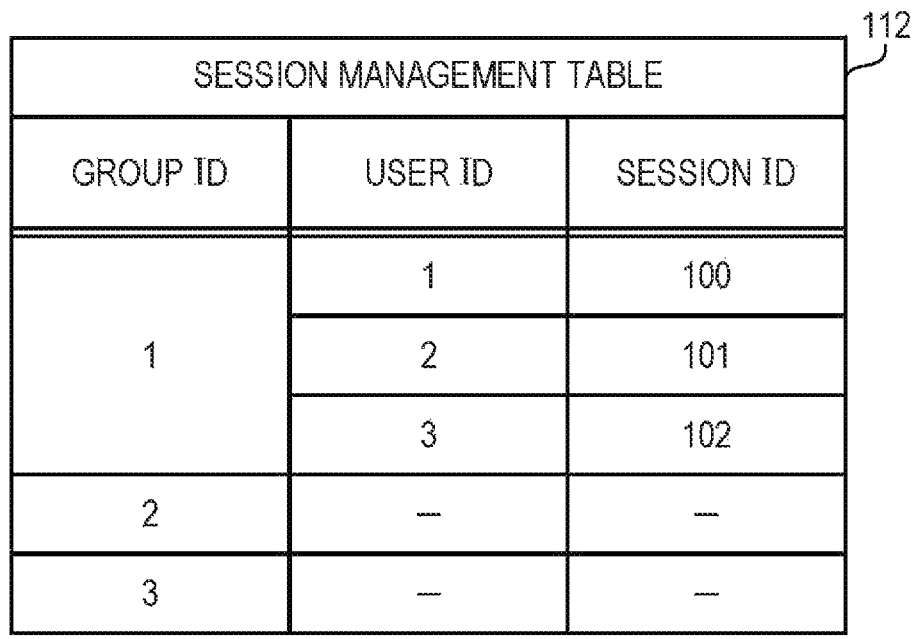
FIG. 7 is a diagram illustrating an example of a session management table according to a second embodiment.

FIG. 7 is a diagram illustrating an example of a session management table according to the second embodiment. A session management table 112 is stored in the storage unit 110. The session management unit 120 updates the session management table 112. Each record of the session management table 112 includes items of "group ID", "user ID", and "session ID".

In the item of "group ID", a group ID is registered. In the item of "user ID", a user ID is registered. In the item of "session ID", a session ID (identification information of a session) is registered.

For example, in the session management table 112, a record in which the group ID is "1", the user ID is "1", and the session ID is "100" is registered. This record indicates that a session with the session ID "100" is generated for a terminal corresponding to the user ID "1" belonging to a group with the group ID "1".

Here, the user ID "1" is also associated with identification information of the terminal. For example, the user ID "1" is the user ID of the worker U1. In addition, a terminal used by the worker U1 is the operation terminal 200. For this reason, the user ID "1" is associated with identification information of the operation terminal 200. In this case, since the operation terminal 200 may be identified on the basis of the user ID "1", the user ID "1" itself may be regarded as the identification information of the operation terminal 200.

Figure 8:
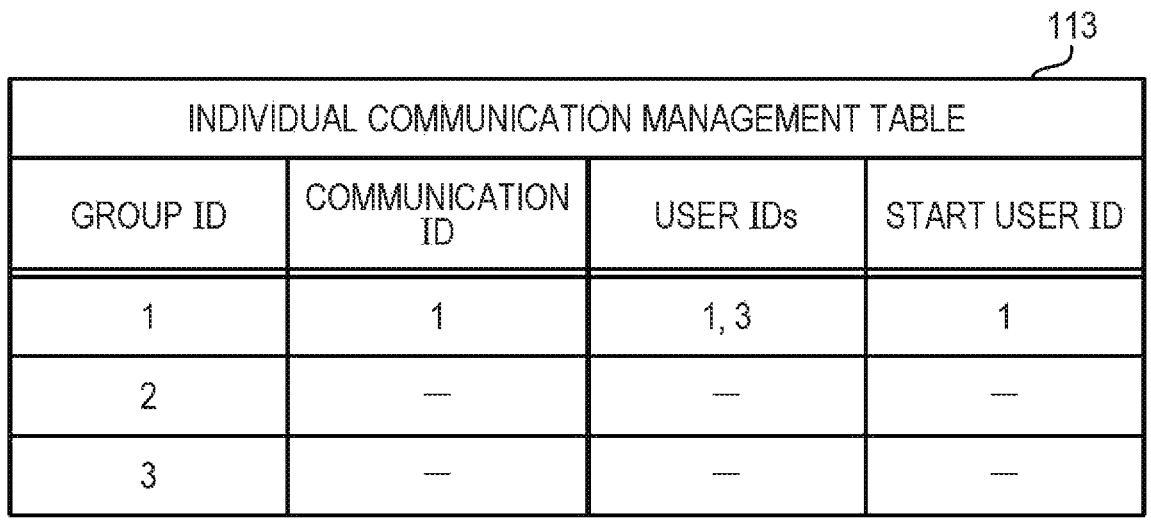
FIG. 8 is a diagram illustrating an example of an individual communication management table according to a second embodiment.

In the session management table 112, a session ID of a session dynamically generated for a group and a user ID registered in the group management table 111 is registered. For this reason, in the session management table 112, the user ID and the session ID is not set for a group which is not using a service at present. In FIGS. 7 and 8, no setting is represented by "-" (hyphen symbol) (the same applies to the following description).

FIG. 8 is a diagram illustrating an example of an individual communication management table according to the second embodiment. An individual communication management table 113 is stored in the storage unit 110. The session management unit 120 updates the individual communication management table 113. Each record of the individual communication management table 113 includes items of "group ID", "communication ID", "user IDs", and "start user ID".

In the item of "group ID", a group ID is registered. In the item of "communication ID", a communication ID (identification information of individual communication) is registered. In the item of "user IDs", a combination of user IDs corresponding to a pair of terminals performing individual communication is registered. In the item of "start user ID", a user ID corresponding to a terminal which starts (transmits a notification of an individual communication start) the individual communication among the pair of terminals performing the individual communication, is registered.

For example, in the individual communication management table 113, a record in which the group ID is "1", the communication ID is "1", the user IDs are "1" and "3", and the start user ID is "1" is registered. This record indicates that individual communication identified by the communication ID "1" is performed in a group with the group ID "1". The record also indicates that the individual communication with the communication ID "1" is individual communication by a pair of the operation terminal 200 corresponding to the user ID "1" and the support terminal 400 corresponding to the user ID "3". Further, the record indicates that the individual communication with the communication ID "1" is started in response to a request from the operation terminal 200 corresponding to the user ID "1".

In a case where a record of individual communication is registered in the individual communication management table 113, new individual sessions corresponding to the individual communication are generated. For example, as described above, in a case of the individual communication by the pair of the operation terminal 200 and the support terminal 400, the session management unit 120 generates an individual session between the operation terminal 200 and the server 100 and an individual session between the support terminal 400 and the server 100.

Next, a procedure of voice communication in the remote support system according to the second embodiment will be described. First, a processing procedure performed by the operation terminal 200 will be described, and then, a processing procedure performed by the server 100 will be described.

Figure 9:
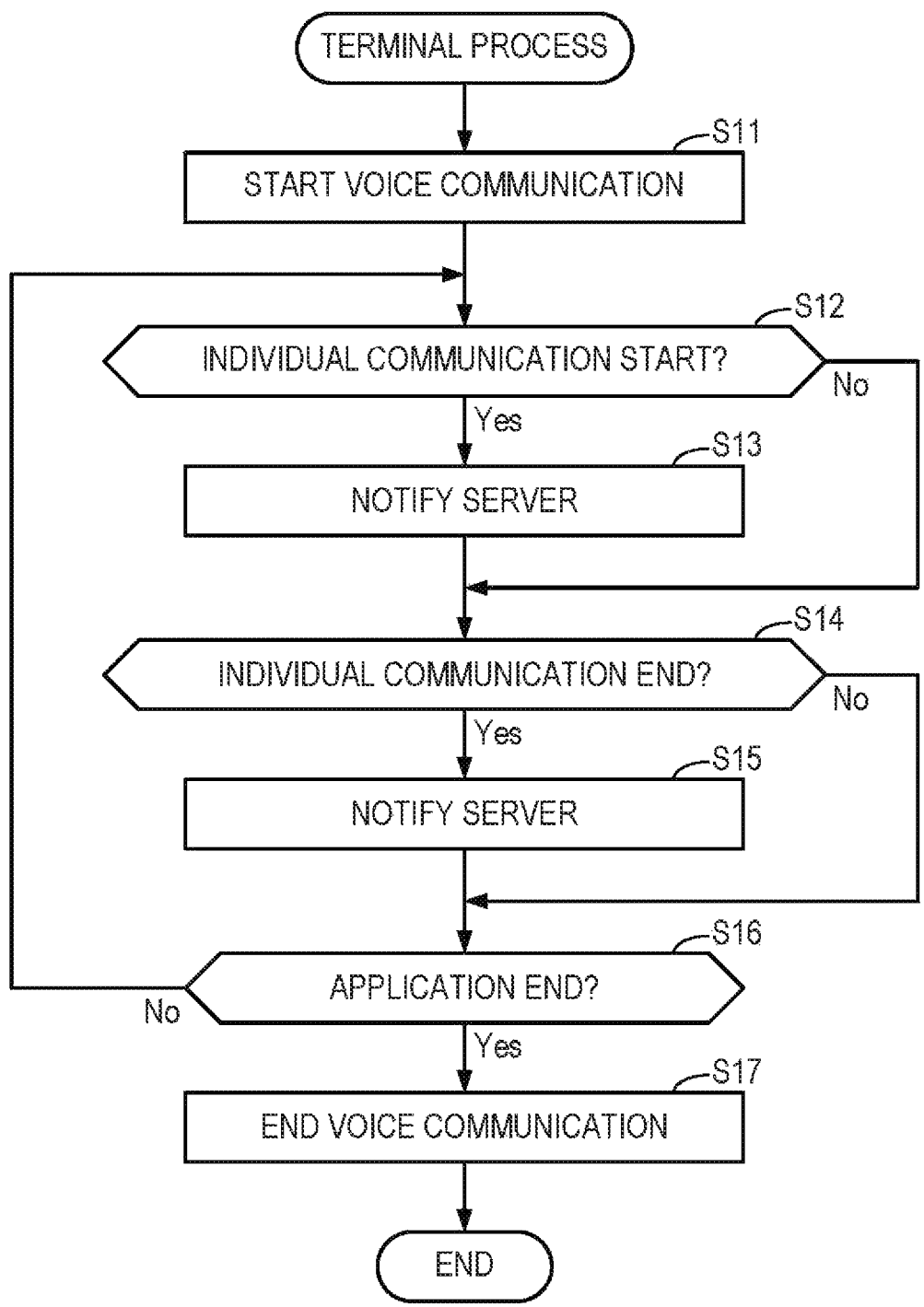
FIG. 9 is a flowchart illustrating an exemplary process performed by a terminal according to a second embodiment.

FIG. 9 is a flowchart illustrating an exemplary process performed by a terminal according to the second embodiment. Hereinafter, the process illustrated in FIG. 9 will be described.

The communication unit 220 receives a predetermined operation input by the worker U1, and logs in a conference room for remote support provided by the server 100 (S11). For example, the server 100 provides the conference room corresponding to a group of the operation terminal 200 and the support terminals 300 and 400 on a predetermined web page. The communication unit 220 logs in the conference room using, for example, a user ID and a password of the worker U1. Similarly, the communication units 320 and 420 log in the conference room provided by the server 100. Then, the communication unit 220 starts a voice communication with the support terminals 300 and 400 via the server 100. The worker U1 may continue to work while receiving audible support from the supporters U2 and U3.

The communication unit 220 determines whether or not an input for starting individual communication is received from the worker U1 (S12). In a case of receiving the input for starting individual communication, the process proceeds to S13. In a case of not receiving the input for starting individual communication, the process proceeds to S14. The input for starting individual communication includes a user ID (for example, a user ID "3") of the other party user of individual communication designated by the worker U1 and a user ID (for example, a user ID "1") of the worker U1 which is a requester.

The communication unit 220 notifies the server 100 of an individual communication start (S13). This notification includes the user ID of the other party user of individual communication designated by the worker U1 and the user ID of the worker U1 which is the requester. Thereafter, the communication unit 220 does not receive audio data from terminals (for example, the support terminal 300) other than the terminal (for example, the support terminal 400) corresponding to the designated user ID.

The communication unit 220 determines whether or not an input for ending individual communication from the worker U1 is received (S14). In a case of receiving the input for ending individual communication, the process proceeds to S15. In a case of not receiving the input for ending individual communication, the process proceeds to S16.

The communication unit 220 notifies the server 100 of an individual communication end (S15). Thereafter, the communication unit 220 restarts to receive audio data from the terminals (for example, the support terminal 300) other than the terminal (for example, the support terminal 400) corresponding to the user ID designated as the other party user of individual communication.

The communication unit 220 determines whether or not an input for ending application (client application) for voice communication is received from the worker U1 (S16). In a case of receiving the input for ending application, the process proceeds to S17. In a case of not receiving the input for ending application, the communication unit 220 and the audio unit 230 continue the conference by voice communication and the process proceeds to S12.

The communication unit 220 ends the voice communication (S17). The communication unit 220 ends the application (client application) for voice communication.

Figure 10:
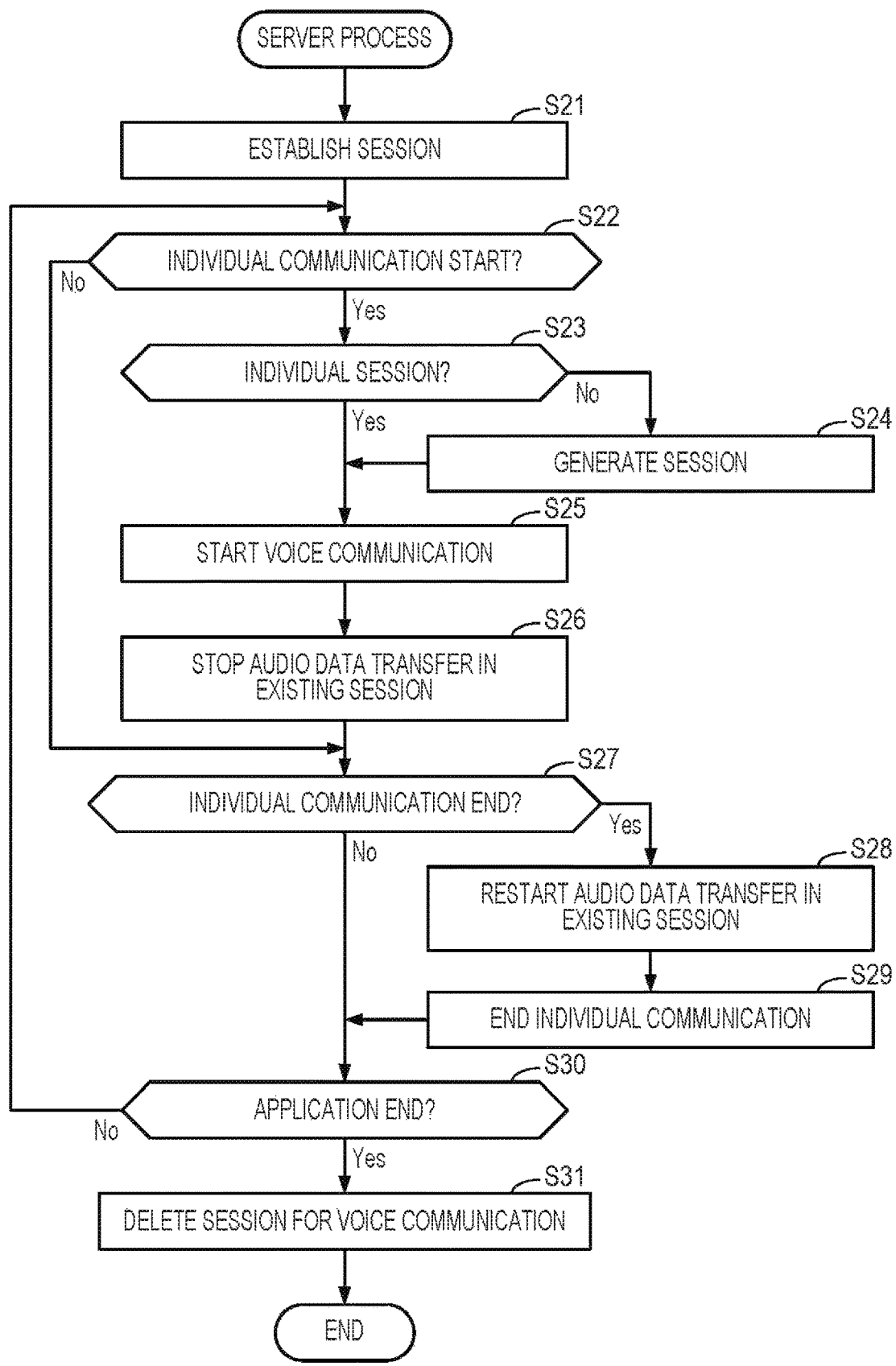
FIG. 10 is a flowchart illustrating an exemplary process performed by a server according to a second embodiment.

FIG. 10 is a flowchart illustrating an exemplary process performed by a server according to the second embodiment. Hereinafter, the process illustrated in FIG. 10 will be described.

The session management unit 120 establishes sessions for group members (S21). That is, the session management unit 120 generates session IDs for user IDs used for logging in of the operation terminal 200 and the support terminals 300 and 400, and registers the session IDs to the session management table 112 stored in the storage unit 110. A group ID corresponding to the user IDs is registered in advance in the session management table 112. The transfer unit 130 starts voice communication (audio data transfer) between the operation terminal 200 and the support terminals 300 and 400 corresponding to the sessions belonging to the group.

The session management unit 120 determines whether or not a notification of starting individual communication is received from any terminal (S22). In a case of receiving the notification of starting individual communication, the process proceeds to S23. In a case of not receiving the notification of starting individual communication, the process proceeds to S27.

The session management unit 120 determines whether or not individual sessions corresponding to a pair of a user ID of a requester and a user ID of the other party user of individual communication, which is included in the notification of starting individual communication, already exist with reference to the individual communication management table 113 stored in the storage unit 110 (S23). In a case where the individual sessions already exist, the process proceeds to S25. In a case where the individual sessions do not exist, the process proceeds to S24.

The session management unit 120 generates individual sessions for terminals corresponding to the pair of user IDs involved in the individual communication, which is designated in the notification of starting individual communication (S24). The session management unit 120 registers information ("communication ID", "user IDs", and "start user ID") related to the generated individual sessions to the individual communication management table 113. Then, the process proceeds to S25.

The transfer unit 130 starts voice communication using the individual sessions for terminals involved in the individual communication with reference to the individual communication management table 113 (S25). For example, assuming that, as illustrated in FIG. 8, only the record with the communication ID "1" is registered with respect to the group ID "1" in the individual communication management table 113, the transfer unit 130 starts individual communication between the operation terminal 200 corresponding to the user ID "1" and the support terminal 400 corresponding to the user ID "3".

The transfer unit 130 stops audio data transfer in an existing session directed to a notification source terminal of the notification of starting individual communication with reference to the session management table 112 and the individual communication management table 113 (S26). For example, in the specific example in S25, the notification source terminal of the notification of starting individual communication is the operation terminal 200 corresponding to the user ID "1". In this case, in the session management table 112, a session corresponding to the user ID "1" is the existing session. As a result, for example, the transfer unit 130 transfers the audio data of the support terminal 400 to the operation terminal 200, but does not transfer the audio data of the support terminal 300 to the operation terminal 200.

The session management unit 120 determines whether or not a notification of ending individual communication is received from any terminal (S27). In a case of receiving the notification of ending individual communication, the process proceeds to S28. In a case of not receiving the notification of ending individual communication, the process proceeds to S30.

The transfer unit 130 restarts audio data transfer, which is stopped in S26, in the existing session to the notification source terminal of the notification of starting individual communication (S28). For example, in a case where the notification source terminal of the notification of starting individual communication is the operation terminal 200, the transfer unit 130 restarts to transfer audio data of the support terminal 300 to the operation terminal 200.

The transfer unit 130 ends the voice communication between the terminals involved in the individual communication (S29). The session management unit 120 deletes the record with the communication ID corresponding to the individual communication to be ended from the individual communication management table 113. That is, the session management unit 120 deletes the individual sessions generated for the individual communication. Then, the process proceeds to S30.

The session management unit 120 determines whether or not a notification of ending application (client application on a terminal side) for voice communication is received from any terminal (S30). In a case of receiving the notification of ending application, the process proceeds to S31. In a case of not receiving the notification of ending application, the session management unit 120 and the transfer unit 130 continue the conference by voice communication and the process proceeds to S22.

The session management unit 120 deletes the sessions for voice communication of the group registered in the session management table 112 (S31).

Figures 11, 12:
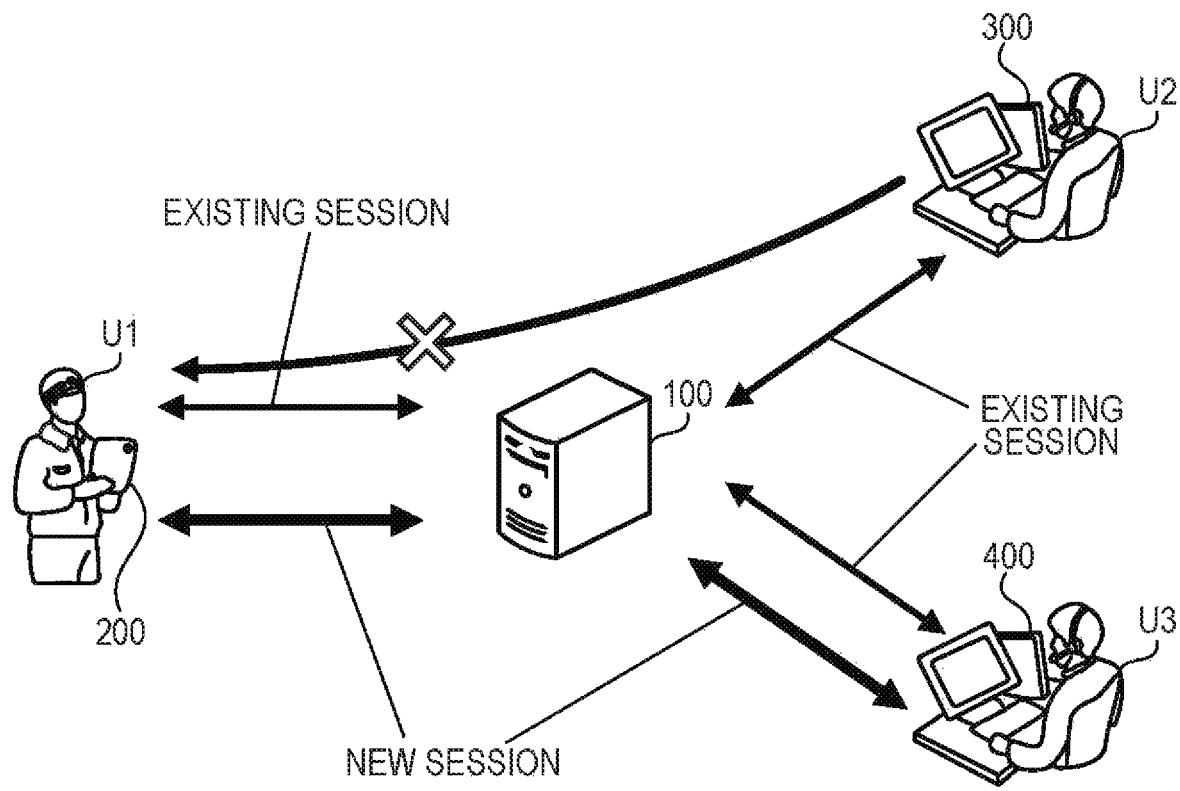
FIG. 11 is a diagram illustrating a specific example of suppressing audio data transfer according to a second embodiment.
FIG. 12 is a diagram illustrating an example of a data-blocking management table according to a third embodiment.

FIG. 11 is a diagram illustrating a specific example of suppressing audio data transfer according to the second embodiment. For example, the server 100 respectively establishes sessions with the operation terminal 200 and the support terminals 300 and 400 to realize remote support involving the three persons of the worker U1 and the supporters U2 and U3. At this time, the worker U1, who is the supported user, receives audible support from both of the supporters U2 and U3 and, for example, the worker U1 may want to listen to the voice of the supporter U3.

In this case, the worker U1 operates a predetermined GUI displayed by the operation terminal 200 to select the supporter U3 with the user ID "3" as the other party user of individual communication. Upon receiving the selection from the operation terminal 200, the server 100 establishes new individual sessions with the operation terminal 200 and the support terminal 400, respectively, and starts voice communication between the operation terminal 200 and the support terminal 400. Then, the server 100 stops audio data transfer from the support terminals 300 and 400 to the operation terminal 200 using the existing session.

In this way, audio data transmitted by the support terminal 300 is not transferred to the operation terminal 200. On the other hand, other voice communication is maintained. That is, audio data transmitted by the operation terminal 200 is transferred to the support terminals 300 and 400. Audio data transmitted by the support terminal 300 is transferred to the support terminal 400. Audio data transmitted by the support terminal 400 is transferred to the operation terminal 200 and the support terminal 300.

Therefore, audible output at the support terminal 300 includes a voice of the worker U1 and a voice of the supporter U3. Audible output at the support terminal 400 includes the voice of the worker U1 and a voice of the supporter U2.

Audible output at the operation terminal 200 includes the voice of the supporter U3, but does not include the voice of the supporter U2. Therefore, since the worker U1 may hear only the voice of the supporter U3 among the supporters U2 and U3, a decrease of audio perceptibility may be suppressed. Further, voice communication other than voice communication from the support terminal 300 to the operation terminal 200 may be maintained.

A plurality of communication IDs may be registered for one group. For example, a case where there are more than two supporters and more than two support terminals may be considered. In this case, in the example of the individual communication management table 113 illustrated in FIG. 8, the session management unit 120 may register a record of another individual communication (a user other than the user ID "3" is the other party) in which the user ID "1" is the start user ID. Then, the transfer unit 130 transfers only audio data of a plurality of supporters designated as the other parties of individual communication to the operation terminal 200. In this way, it is also considered that the worker U1 may select the plurality of supporters whom the worker U1 wants to listen to.

While performing individual communication with a certain communication ID, the server 100 may start individual communication with another communication ID. Specifically, in the example of the individual communication management table 113 illustrated in FIG. 8, the session management unit 120 may additionally register a record of another individual communication (a user other than the user ID "3" is the other party) in which the user ID "1" is the start user ID. Then, the session management unit 120 further generates an individual session corresponding to the new record, and adds another terminal to the existing terminal group (for example, the operation terminal 200 and the support terminal 400) performing individual communication.

In this way, for example, the server 100 may dynamically update the terminal group performing individual communication among the plurality of terminals in accordance with an instruction from the operation terminal 200. In this manner, the other party of individual communication may be added by the worker U1 after the individual communication is started.

Third Embodiment

Hereinafter, a third embodiment will be described. Features of the third embodiment different from those of the second embodiment described above will be mainly described, and descriptions of features of the third embodiment common to those of the second embodiment will be omitted.

In the second embodiment, the server 100 controls sessions to limit audio data transferred to one terminal (for example, the operation terminal 200). On the other hand, it is considered that a terminal controls to limit audible output of a voice of a specific user. In the third embodiment, an example in which the operation terminal 200 controls to limit audible output of a voice of a specific supporter will be described.

Each of devices included in the remote support system according to the third embodiment is similar to those included in the remote support system according to the second embodiment illustrated in FIG. 2. Therefore, also in the third embodiment, similar names and reference numerals to those in the second embodiment are used. However, the operation terminal 200 according to the third embodiment also stores therein a data-blocking management table to control audible output. According to the third embodiment, the server 100 does not hold the individual communication management table 113.

FIG. 12 is a diagram illustrating an example of a data-blocking management table according to the third embodiment. A data-blocking management table 211 is stored in the storage unit 210. The communication unit 220 updates the data-blocking management table 211. The data-blocking management table 211 includes items of "group ID", "communication ID", "user ID", and "blocking flag".

In the item of "group ID", a group ID is registered. In the item of "communication ID", a communication ID is registered. In the item of "user ID", a user ID of a user (the other party user) using the other party terminal which communicates with the own terminal is registered. In the item of "blocking flag", a flag (referred to as "blocking flag") indicating whether to discard received audio data of the other party user is registered. The blocking flag "true" indicates that the audio data is to be discarded. A voice corresponding to audio data to be discarded is not output from the speaker 208b. The blocking flag "false" indicates that the audio data is not to be discarded. A voice corresponding to audio data not to be discarded is output from the speaker 208b.

For example, in the data-blocking management table 211, a record in which the group ID is "1", the communication ID is "1", the user ID is "2", and the blocking flag is "true" is registered. This record represents individual communication identified by the communication ID "1" belonging to a group with the group ID "1". The record indicates that in a case where audio data corresponding to the user ID "2" is received, the audio data is to be discarded.

In addition, for example, in the data-blocking management table 211, a record in which the group ID is "1", the communication ID is "2", the user ID is "3", and the blocking flag is "false" is registered. This record represents individual communication identified by the communication ID "2" belonging to a group with the group ID "1". The record indicates that in a case where audio data corresponding to the user ID "3" is received, the audio data is not to be discarded.

Next, a procedure of voice communication in the remote support system according to the third embodiment will be described. First, a processing procedure performed by the operation terminal 200 will be described, and then, a processing procedure performed by the server 100 will be described.

Figure 13:
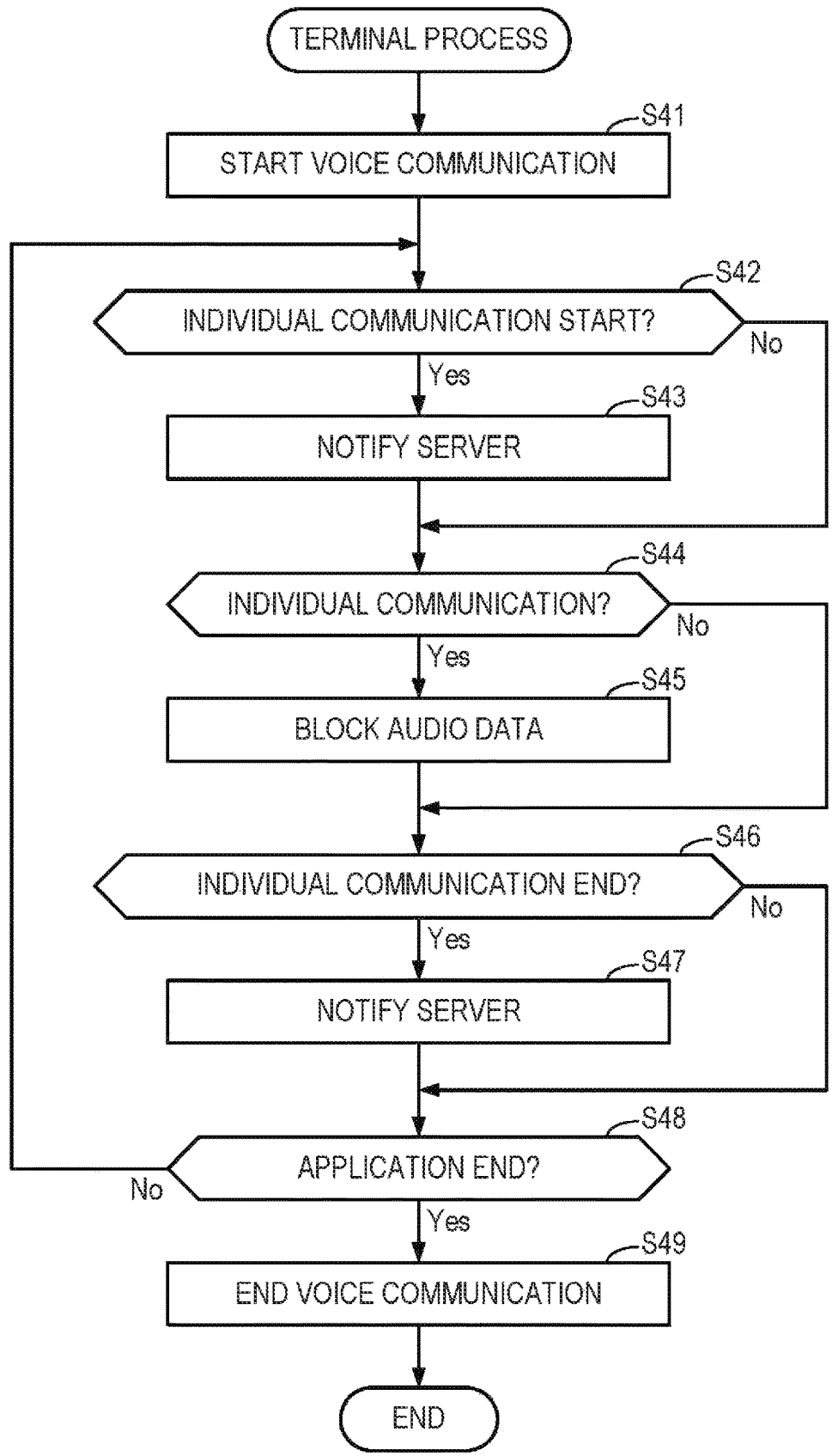
FIG. 13 is a flowchart illustrating an exemplary process performed by a terminal according to a third embodiment.

FIG. 13 is a flowchart illustrating an exemplary process performed by a terminal according to the third embodiment. Hereinafter, the process illustrated in FIG. 13 will be described.

The communication unit 220 receives a predetermined operation input by the worker U1, and logs in a conference room for remote support provided by the server 100 (S41). For example, the server 100 provides the conference room corresponding to a group of the operation terminal 200 and the support terminals 300 and 400 on a predetermined web page. The communication unit 220 logs in the conference room using, for example, a user ID and a password of the worker U1. Similarly, the communication units 320 and 420 log in the conference room provided by the server 100. Then, the communication unit 220 starts a voice communication with the support terminals 300 and 400 via the server 100. The worker U1 may continue to work while receiving audible support from the supporters U2 and U3.

The communication unit 220 determines whether or not an input for starting individual communication is received from the worker U1 (S42). In a case of receiving the input for starting individual communication, the process proceeds to S43. In a case of not receiving the input for starting individual communication, the process proceeds to S44. The input for starting individual communication includes a user ID (for example, a user ID "3") of the other party user of individual communication designated by the worker U1. The communication unit 220 may receive an input of a user ID (for example, the user ID "2") other than the other party of individual communication as an input for starting individual communication.

The communication unit 220 notifies the server 100 of an individual communication start (S43). The notification of starting individual communication includes the user ID "1" of the worker U1 using the operation terminal 200. Thereafter, in response to the notification, audio data received by the communication unit 220 is attached with a user ID.

The communication unit 220 identifies the user ID "2" other than the designated user ID "3" belonging to the group with the group ID "1" of the user ID "1" corresponding to the operation terminal 200. The communication unit 220 may identify the user ID "2" by inquiring of the server 100 about the user IDs belonging to the group with the group ID "1". Alternatively, the communication unit 220 may identify the user ID "2" by referring predetermined information indicating a correspondence between the group ID and the user IDs stored in the storage unit 210. In the data-blocking management table 211 stored in the storage unit 210, the communication unit 220 registers a record with the group ID "1" and the communication ID "1" (the user ID "2" and the blocking flag "true"). Further, in the data-blocking management table 211, the communication unit 220 registers a record with the group ID "1" and the communication ID "2" (the user ID "3" and the blocking flag "false").

In S42, the communication unit 220 may be considered to receive a selection of user IDs (for example, the user ID "2") other than the other party of individual communication. In this case, the communication unit 220 identifies the user (for example, the user ID "3") other than the user ID "2" belonging to the group with the group ID "1" in S43. As described above, the communication unit 220 registers the record with the communication ID "1" and the record with the communication ID "2" in the data-blocking management table 211.

The communication unit 220 determines whether or not any individual communication is in progress with reference to the data-blocking management table 211 (S44). In a case where some individual communication is in progress, the process proceeds to S45. In a case where no individual communication is in progress, the process proceeds to S46 (audible output for the received audio data is performed without limitation). If any record of individual communication is already registered in the data-blocking management table 211, the individual communication is in process. On the other hand, if no record of individual communication is registered in the data-blocking management table 211, no individual communication is in process.

The communication unit 220 blocks audio data corresponding to user IDs other than the user ID of the other party of individual communication (S45). Specifically, the communication unit 220 discards received audio data having user IDs other than the user ID of the other party of individual communication. Here, "the user ID of the other party of individual communication" is a user ID with the blocking flag "false" among the user IDs registered in the data-blocking management table 211. "The user ID other than the user ID of the other party of individual communication" is a user ID with the blocking flag "true" among the user IDs registered in the data-blocking management table 211. As a result of discarding the audio data, the audio unit 230 causes the speaker 208b to perform audible output for audio data corresponding to the user ID of the other party of individual communication.

The communication unit 220 determines whether or not an input for ending individual communication is received from the worker U1 (S46). In a case of receiving the input for ending individual communication, the process proceeds to S47. In a case of not receiving the input for ending individual communication, the process proceeds to S48.

The communication unit 220 notifies the server 100 of an individual communication end (S47). The notification of ending individual communication includes the user ID "1" of the worker U1 using the operation terminal 200. Thereafter, in response to the notification, audio data received by the communication unit 220 is not attached with a user ID. The communication unit 220 deletes all of the records registered in the data-blocking management table 211.

The communication unit 220 determines whether or not an input for ending application (client application) for voice communication is received from the worker U1 (S48). In a case of receiving the input for ending application, the process proceeds to S49. In a case of not receiving the input for ending application, the communication unit 220 and the audio unit 230 continue the conference by voice communication and the process proceeds to S42.

The communication unit 220 ends the voice communication (S49). The communication unit 220 ends the application (client application) for voice communication.

Figure 14:
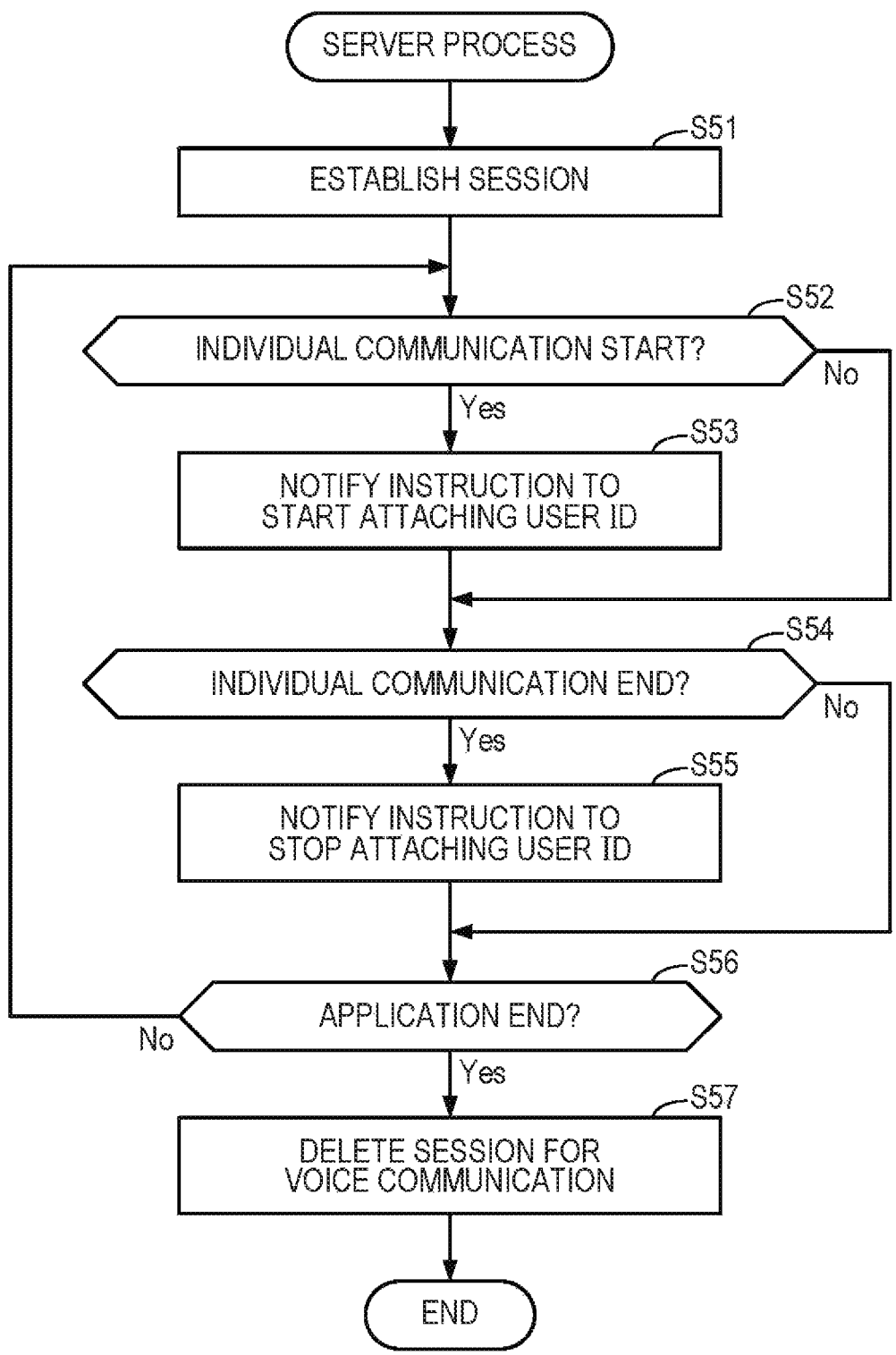
FIG. 14 is a flowchart illustrating an exemplary process performed by a server according to a third embodiment.

FIG. 14 is a flowchart illustrating an exemplary process performed by a server according to the third embodiment. Hereinafter, the process illustrated in FIG. 14 will be described.

The session management unit 120 establishes sessions for group members (S51). That is, the session management unit 120 generates session IDs for user IDs used for logging in of the operation terminal 200 and the support terminals 300 and 400, and registers the session IDs to the session management table 112 stored in the storage unit 110. A group ID corresponding to the user IDs is registered in advance in the session management table 112. The transfer unit 130 starts voice communication (audio data transfer) between the operation terminal 200 and the support terminals 300 and 400 corresponding to the sessions belonging to the group.

The session management unit 120 determines whether or not a notification of starting individual communication is received (S52). In a case of receiving the notification of starting individual communication, the process proceeds to S53. In a case of not receiving the notification of starting individual communication, the process proceeds to S54.

The session management unit 120 notifies, with reference to the group management table 111 stored in the storage unit 110, member terminals in a group, to which a user ID included in the notification of starting individual communication belongs, of an instruction to start attaching a user ID to audio data (S53). For example, in a case where the user ID of the notification of starting individual communication is "1", the member terminals are the operation terminal 200 and the support terminals 300 and 400 corresponding to the user ID "1", "2", and "3". Therefore, the session management unit 120 notifies the operation terminal 200 and the support terminals 300 and 400 of the instruction to start attaching a user ID to audio data. Thereafter, a user ID is attached by each of the terminals to audio data of the group.

The session management unit 120 determines whether or not a notification of ending individual communication is received (S54). In a case of receiving the notification of ending individual communication, the process proceeds to S55. In a case of not receiving the notification of ending individual communication, the process proceeds to S56.

The session management unit 120 notifies member terminals in a group, to which the user ID included in the notification of ending individual communication belongs, of an instruction to stop attaching a user ID to audio data (S55). For example, in a case where the user ID of the notification of ending individual communication is "1", the session management unit 120 notifies the operation terminal 200 and the support terminals 300 and 400 of the instruction to stop attaching a user ID to audio data. Thereafter, a user ID is not attached to audio data of the group.

The session management unit 120 determines whether or not a notification of ending application (client application on a terminal side) for voice communication is received from any terminal (S56). In a case of receiving the notification of ending application, the process proceeds to S57. In a case of not receiving the notification of ending application, the session management unit 120 and the transfer unit 130 continue the conference by voice communication and the process proceeds to S52.

The session management unit 120 deletes the sessions for voice communication of the group registered in the session management table 112 (S57).

The user ID is not attached to audio data in normal time (during the individual communication is not performed), and thus, overhead (for example, loads on the terminals and the network 10) due to attaching a user ID to audio data is decreased.

Figure 15:
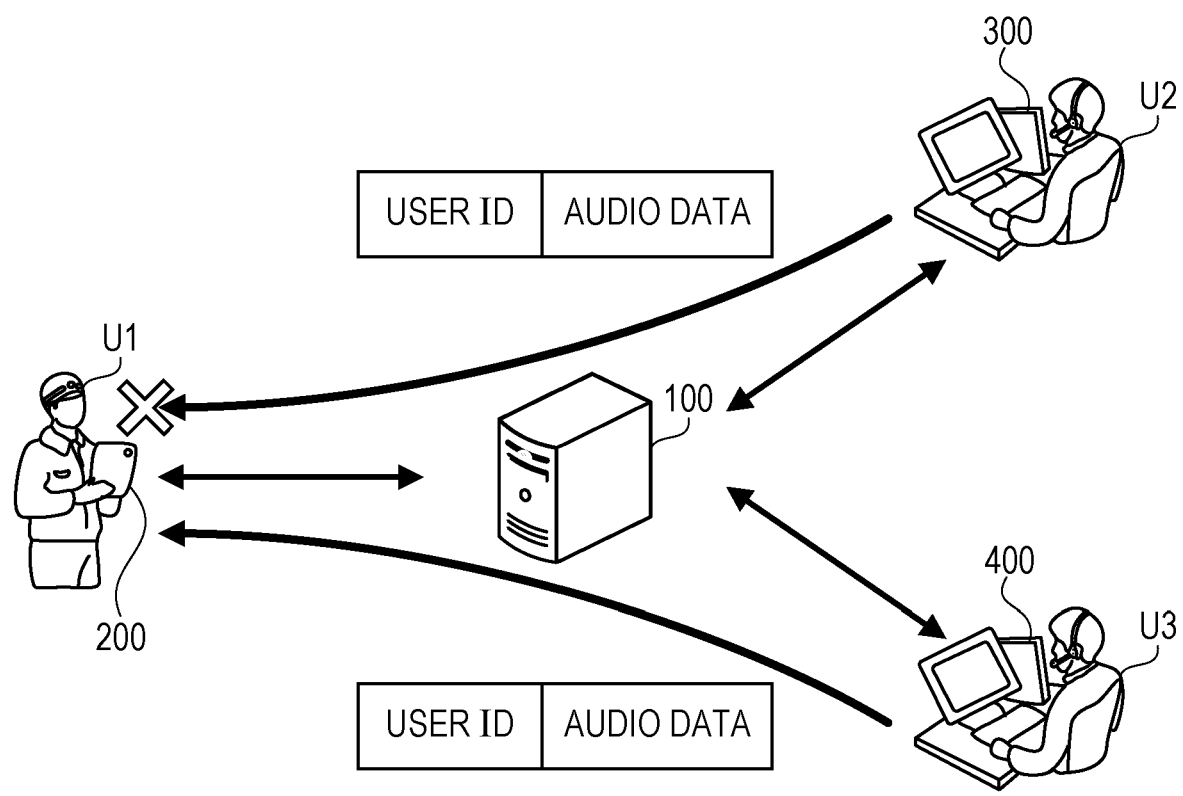
FIG. 15 is a diagram illustrating a specific example of suppressing audio data transfer according to a third embodiment.

FIG. 15 is a diagram illustrating a specific example of suppressing audio data transfer according to the third embodiment. For example, the server 100 respectively establishes sessions with the operation terminal 200 and the support terminals 300 and 400 to realize remote support involving the three persons of the worker U1 and the supporters U2 and U3. At this time, the worker U1, who is the supported user, receives audible support from both of the supporters U2 and U3 and, for example, the worker U1 may want to listen to the voice of the supporter U3.

In this case, the worker U1 operates a predetermined GUI displayed by the operation terminal 200 to select the supporter U3 with the user ID "3" as the other party user of individual communication. Here, the worker U1 may be considered to select a user (the user ID "2") other than the other party of the individual communication. In response to the selection of the worker U1, the operation terminal 200 sets the data-blocking management table 211 so as to discard received audio data to which the user ID other than the user ID "3" is attached.

The operation terminal 200 transmits a notification of starting individual communication to the server 100. The server 100 instructs the operation terminal 200 and the support terminals 300 and 400 so as to start attaching a user ID to audio data. Then, the operation terminal 200 starts to transmit audio data attached with the user ID "1". The support terminal 300 starts to transmit audio data attached with the user ID "2". The support terminal 400 starts to transmit audio data attached with the user ID "3".

The operation terminal 200 receives audio data attached with the user ID "2". According to the data-blocking management table 211, the user ID "2" is associated with the blocking flag "true", that is, audible output is not permitted for the user ID "2". Therefore, the operation terminal 200 discards the audio data attached with the user ID "2".

The operation terminal 200 also receives audio data attached with the user ID "3". According to the data-blocking management table 211, the user ID "3" is associated with the blocking flag "false", that is, audible output is permitted for the user ID "3". Therefore, the operation terminal 200 causes the speaker 208b to output a voice corresponding to the audio data attached with the user ID "3".

That is, the operation terminal 200 receives designation of a specific terminal (for example, the support terminal 300) among the support terminals 300 and 400 (for example, receives the designation by an input of a user ID). Upon receiving, from the support terminal 300, audio data and information including identification information (for example, the user ID "2") of the support terminal 300, the operation terminal 200 determines whether or not the support terminal 300 is the designated specific terminal on the basis of the identification information of the support terminal 300. In a case where the support terminal 300 is the designated specific terminal (the support terminal 300 is a terminal not permitted to perform audible output for audio data), the operation terminal 200 controls audible output for audio data to be suppressed.

In this way, audible output for the audio data transmitted by the support terminal 300 is not performed at the operation terminal 200. On the other hand, audible output for the audio data transmitted by the support terminal 400 is performed at the operation terminal 200. The audio data transmitted by the operation terminal 200 is transferred to the support terminals 300 and 400, and audible output for the audio data is performed at the support terminals 300 and 400.

That is, audible output at the support terminal 300 includes a voice of the worker U1 and a voice of the supporter U3. Audible output at the support terminal 400 includes the voice of the worker U1 and a voice of the supporter U2.

Audible output at the operation terminal 200 includes the voice of the supporter U3, but does not include the voice of the supporter U2. Therefore, since the worker U1 may hear only the voice of the supporter U3, a decrease of audio perceptibility may be suppressed. Further, voice communication other than voice communication from the support terminal 300 to the operation terminal 200 may be maintained.

The worker U1 may select a plurality of user IDs as other party user IDs performing individual communication. The operation terminal 200 sets the blocking flag of the data-blocking management table 211 to "false" for a user ID designated by the worker U1 as the other party user of individual communication, and sets the blocking flag to "true" for other user IDs belonging to the same group. Alternatively, the operation terminal 200 may set the blocking flag to "true" for a user ID designated by the worker U1 as a user other than the other party of individual communication, and may set the blocking flag to "false" for other user IDs belonging to the same group.

In this manner, based on the data-blocking management table 211, the operation terminal 200 may perform audible output for only audio data of a plurality of other party users designated by the worker U1.

Fourth Embodiment

Hereinafter, a fourth embodiment will be described. Features of the fourth embodiment different from those of the second embodiment described above will be mainly described, and descriptions of features of the fourth embodiment common to those of the second embodiment will be omitted.

In the second embodiment, an example in which a new session is generated in addition to the existing session to realize individual communication is described. On the other hand, in the fourth embodiment, an example in which the server 100 controls to realize individual communication without generating a new session will be described.

Each of devices in the remote support system according to the fourth embodiment is similar to those included in the remote support system according to the second embodiment illustrated in FIG. 2. Therefore, also in the fourth embodiment, similar names and reference numerals to those in the second embodiment are used.

First, a procedure of voice communication in the remote support system according to the fourth embodiment will be described. Since a processing procedure performed by the operation terminal 200 is the same as the processing procedure according to the second embodiment illustrated in FIG. 9, descriptions of the processing procedure will be omitted.

Figure 16:
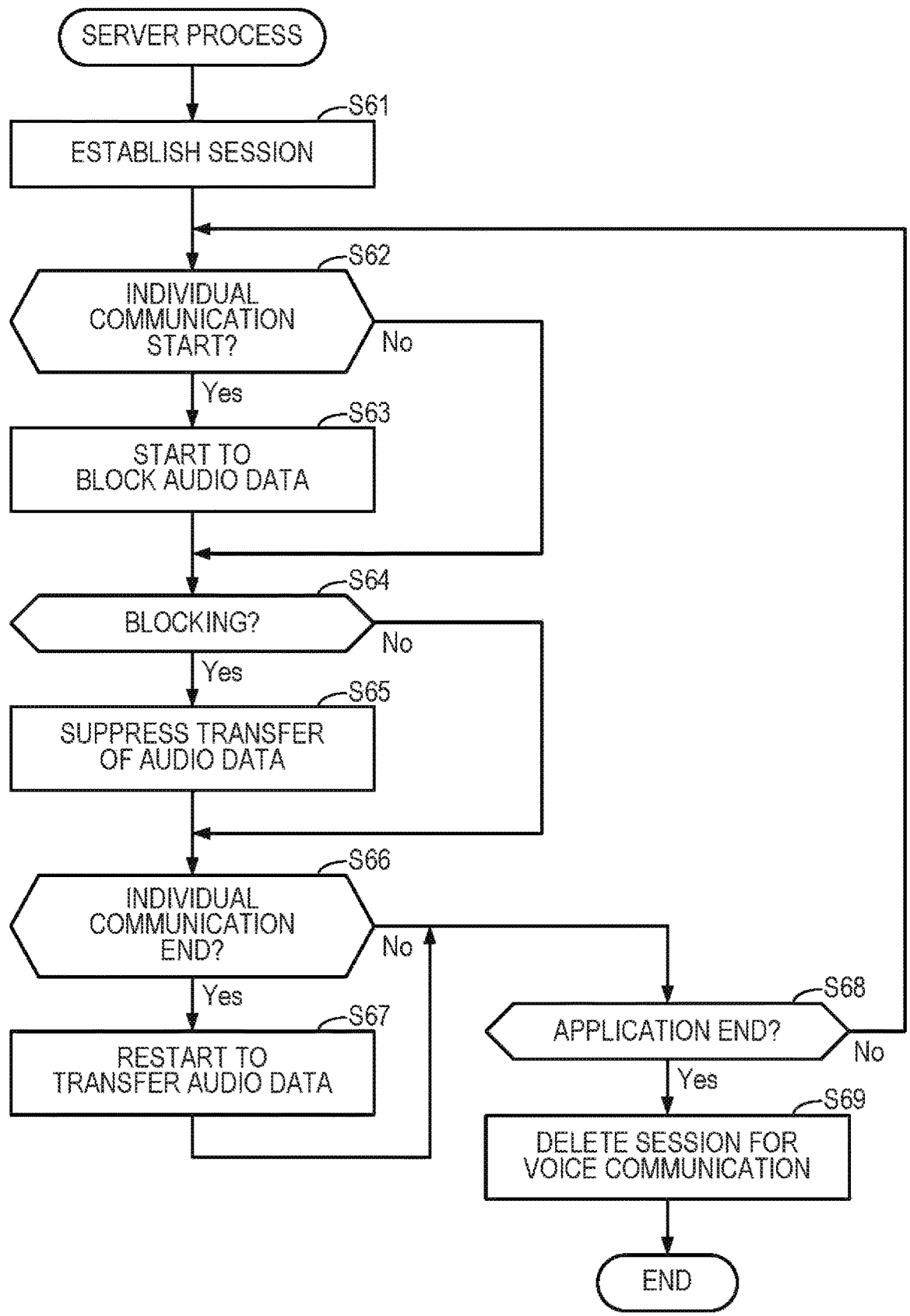
FIG. 16 is a flowchart illustrating an exemplary process performed by a server according to a fourth embodiment.

FIG. 16 is a flowchart illustrating an exemplary process performed by a server according to the fourth embodiment. Hereinafter, the process illustrated in FIG. 16 will be described.

The session management unit 120 establishes sessions for group members (S61). That is, the session management unit 120 generates session IDs for user IDs used for logging in of the operation terminal 200 and the support terminals 300 and 400, and registers the session IDs to the session management table 112 stored in the storage unit 110. A group ID corresponding to the user IDs is registered in advance in the session management table 112. The transfer unit 130 starts voice communication (audio data transfer) between the operation terminal 200 and the support terminals 300 and 400 corresponding to the sessions belonging to the group.

The session management unit 120 determines whether or not a notification of starting individual communication is received from any terminal (S62). In a case of receiving the notification of starting individual communication, the process proceeds to S63. In a case of not receiving the notification of starting individual communication, the process proceeds to S64.

With regard to audio data transfer to a notification source terminal of the notification of starting individual communication, the session management unit 120 starts to block audio data corresponding to session IDs other than the other party user of individual communication (S63). Specifically, the session management unit 120 registers information ("communication ID", "user IDs", and "start user ID") corresponding to the notification of starting individual communication to the individual communication management table 113, and instructs the transfer unit 130 to perform transfer processing based on the registered information.

Upon receiving new audio data, the transfer unit 130 determines whether or not blocking of audio data based on a session ID is to be performed, with reference to the individual communication management table 113 (S64). In a case where blocking of audio data based on a session ID is to be performed, the process proceeds to S65. In a case where blocking of audio data based on a session ID is not to be performed, the process proceeds to S66 (in this case, the audio data is transferred to each of the terminals without being blocked).

For example, when a record of one of the communication IDs related to a group ID corresponding to a session ID of the current audio data is registered in the individual communication management table 113, the transfer unit 130 determines that blocking of audio data based on a session ID is to be performed. On the other hand, when any one of records of the communication IDs is not registered for the group ID corresponding to the session ID of the current audio data, the transfer unit 130 determines that blocking of audio data based on a session ID is not to be performed.

The transfer unit 130 suppresses transfer of audio data of session IDs other than the session ID of the other party user of individual communication (S65). Specifically, for audio data of the group for which blocking of audio data based on a session ID is determined to be performed in S64, the transfer unit 130 transfers audio data of the session ID of the other party of individual communication to a terminal corresponding to the individual communication start session ID, and does not transfer audio data of session IDs other than the other party of individual communication to the terminal. At this time, the transfer unit 130 may suppress transfer of audio data other than the other party of individual communication at a timing when audio data with the session ID of the other party of individual communication is received. That is, the transfer unit 130 may suppress transfer of voices of users other than the other party user of individual communication to a terminal of an individual communication requester only while the other party user of individual communication is talking.

The session management unit 120 determines whether or not a notification of ending individual communication is received from any terminal (S66). In a case of receiving the notification of ending individual communication, the process proceeds to S67. In a case of not receiving the notification of ending individual communication, the process proceeds to S68.

With respect to audio data transfer to a notification source terminal of the notification of ending individual communication, the session management unit 120 restarts to transfer audio data of session IDs other than the session ID of the other party user of individual communication (S67). Specifically, the session management unit 120 deletes the record with the communication ID related to the notification of ending individual communication, that is, the communication ID corresponding to the user ID of the notification source, from the individual communication management table 113.

The session management unit 120 determines whether or not a notification of ending application (client application on a terminal side) for voice communication is received from any terminal (S68). In a case of receiving the notification of ending application, the process proceeds to S69. In a case of not receiving the notification of ending application, the session management unit 120 and the transfer unit 130 continue the conference by voice communication and the process proceeds to S62.

The session management unit 120 deletes the sessions for voice communication of the group (the group to which the notification source terminal of the notification of ending application source belongs) registered in the session management table 112 (S69).

Figure 17:
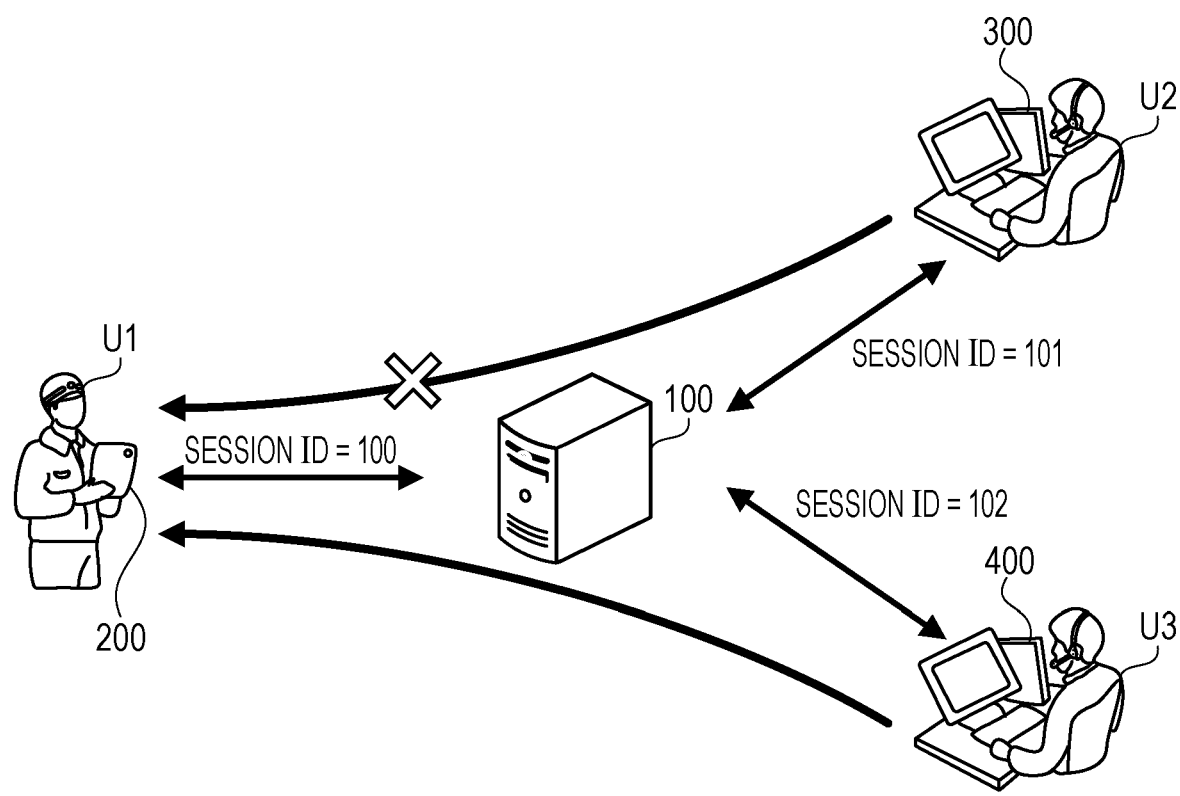
FIG. 17 is a diagram illustrating a specific example of suppressing audio data transfer according to a fourth embodiment.

FIG. 17 is a diagram illustrating a specific example of suppressing audio data transfer according to the fourth embodiment. For example, the server 100 respectively establishes sessions with the operation terminal 200 and the support terminals 300 and 400 to realize remote support involving the three persons of the worker U1 and the supporters U2 and U3. A session ID of a session between the server 100 and the operation terminal 200 is "100". A session ID of a session between the server 100 and the support terminal 300 is "101". A session ID of a session between the server 100 and the support terminal 400 is "102". At this time, the worker U1, who is the supported user, receives audible support from both of the supporters U2 and U3 and, for example, the worker U1 may want to listen to the voice of the supporter U3.

In this case, the worker U1 operates a predetermined GUI displayed by the operation terminal 200 to select the supporter U3 with the user ID "3" as the other party user of individual communication. Upon receiving the selection from the operation terminal 200, the server 100 suppresses transfer of audio data received using sessions other than the session (the session having the session ID "102") between the server 100 and the support terminal 400 corresponding to the user ID "3" to the operation terminal 200.

More specifically, the server 100 receives identification information (for example, an IP address, a user ID "3", and the like) corresponding to the support terminal 400 from the operation terminal 200. The server 100 obtains a session ID (="102") associated with the received identification information of the support terminal 400 with reference to the storage unit 110 storing session IDs in association with the identification information of respective terminals. Upon receiving audio data from the support terminal 400, the server 100 determines whether or not the obtained session ID (="102") matches a session ID (="102") of the received audio data. In a case where a determination result is positive (that is, the session IDs match), the server 100 suppresses transfer of audio data transmitted from the support terminal 300 except for the support terminal 400 to the operation terminal 200. At this time, the server 100 transfers the audio data transmitted from the support terminal 400 to the operation terminal 200.

In this way, audio data transmitted from the support terminal 300 is not transferred to the operation terminal 200 during audio data is transmitted from the support terminal 400. On the other hand, other voice communication is maintained. Therefore, since the worker U1 may listen to only the voice of the supporter U3 among the supporters U2 and U3 during the supporter U3 is talking, a decrease of audio perceptibility by the worker U1 may be suppressed. Further, voice communication other than voice communication from the support terminal 300 to the operation terminal 200 may be maintained.

Also in the fourth embodiment, a plurality of communication IDs may be registered for one group. For example, a case where there are more than two supporters and more than two support terminals may be considered. In this case, in the example of the individual communication management table 113 in FIG. 8, the session management unit 120 may register a record of another individual communication (a user other than the user ID "3" is the other party) in which the user ID "1" is the start user ID. Then, the transfer unit 130 transfers only audio data of a plurality of supporters designated as the other parties of individual communication to the operation terminal 200, and does not transfer audio data of supporters other than the plurality of designated supporters to the operation terminal 200. In this way, it is also considered that the worker U1 may select the plurality of supporters whom the worker U1 wants to listen to.

Information processing according to the first embodiment may be realized by causing the processing unit 1b to execute a program. Information processing according to the second embodiment and the fourth embodiment may be realized by causing the processor 101 to execute a program. Information processing according to the third embodiment may be realized by causing the processor 201 to execute a program. The programs may be recorded in the computer-readable recording media 13 or 21. Each of the server 100 and the operation terminal 200 may be considered to be an example of a computer having a memory and a processor.

For example, by distributing the recording media 13 or 21 in which the programs are recorded, the programs may be distributed. Further, the programs may be stored in another computer and the programs may be distributed over a network.

For example, the server 100 may store (install) a program recorded in the recording medium 13 or a program received from another computer in a storage device such as the RAM 102 or the HDD 103, and may read the program from the storage device to execute the program. For example, the operation terminal 200 may store a program recorded in the recording medium 21 or a program received from another computer in a storage device such as the RAM 202 or the flash memory 203, and may read the program from the storage device to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:

generating primary transfer paths for transmitting audio data between the computer and a plurality of terminals, respectively;

transferring, upon receiving audio data from one terminal of the plurality of terminals, the received audio data to the plurality of terminals other than the one terminal through the primary transfer paths;

receiving first key information for identifying a second terminal of the plurality of terminals from a first terminal of the plurality of terminals, the second terminal being different from the first terminal;

suppressing transfer of first audio data to the first terminal upon receiving the first audio data from a third terminal of the plurality of terminals, the third terminal being different from the first terminal, the third terminal being different from the second terminal;

storing key information for identifying the plurality of terminals in a storage unit in association with path information for identifying the respective primary transfer paths;

obtaining first path information for identifying a first transfer path of the primary transfer paths from the storage unit upon receiving the first key information, the first path information being associated with the first key information;

determining whether the first path information matches second path information for identifying a second transfer path of the primary transfer paths upon receiving the first audio data, the first audio data being received through the second transfer path; and suppressing transfer of the first audio data to the first terminal upon determining that the first path information does not match the second path information.

2. The non-transitory computer-readable recording medium according to claim 1, the process further comprising:

generating secondary transfer paths for transmitting audio data between the computer and the first and second terminals, respectively, upon receiving the first key information;

performing individual communication of transferring audio data between the first terminal and the second terminal through the secondary transfer paths; and suppressing transfer of the first audio data to the first terminal through the primary transfer paths.

3. The non-transitory computer-readable recording medium according to claim 2, the process further comprising:

transferring audio data received from the first terminal to the third terminal through the primary transfer paths.

4. The non-transitory computer-readable recording medium according to claim 2, the process further comprising:

receiving second key information for identifying a fourth terminal of the plurality of terminals from the first terminal after starting the individual communication, the fourth terminal being different from the first terminal, the fourth terminal being different from the second terminal;

generating a new secondary transfer path for transmitting audio data between the computer and the fourth terminal upon receiving the second key information; and involving the fourth terminal in the individual communication to perform transferring audio data among the first terminal, the second terminal, and the fourth terminal with one another through the secondary transfer paths.

5. The non-transitory computer-readable recording medium according to claim 2, the process further comprising:

receiving a notification of ending the individual communication; and deleting the secondary transfer paths and restarting transfer of audio data received from the third terminal to the first terminal through the primary transfer paths upon receiving the notification.

6. An audio data transfer device, comprising:

a memory; and a processor coupled to the memory and the processor configured to:

generate primary transfer paths for transmitting audio data between the audio data transfer device and a plurality of terminals, respectively;

transfer, upon receiving audio data from one terminal of the plurality of terminals, the received audio data to the plurality of terminals other than the one terminal through the primary transfer paths;

receive first key information for identifying a second terminal of the plurality of terminals from a first terminal of the plurality of terminals, the second terminal being different from the first terminal;

suppress transfer of first audio data to the first terminal upon receiving the first audio data from a third terminal of the plurality of terminals, the third terminal being different from the first terminal, the third terminal being different from the second terminal;

store key information for identifying the plurality of terminals in a storage unit in association with path information for identifying the respective primary transfer paths;

obtain first path information for identifying a first transfer path of the primary transfer paths from the storage unit upon receiving the first key information, the first path information being associated with the first key information;

determine whether the first path information matches second path information for identifying a second transfer path of the primary transfer paths upon receiving the first audio data, the first audio data being received through the second transfer path; and suppress transfer of the first audio data to the first terminal upon determining that the first path information does not match the second path information.

7. The audio data transfer device according to claim 6, wherein the processor is configured to:

generate secondary transfer paths for transmitting audio data between the computer and the first and second terminals, respectively, upon receiving the first key information;

perform individual communication of transferring audio data between the first terminal and the second terminal through the secondary transfer paths; and suppress transfer of the first audio data to the first terminal through the primary transfer paths.

8. An audio data transfer method, comprising:

generating, by a computer, primary transfer paths for transmitting audio data between the computer and a plurality of terminals, respectively;

transferring, upon receiving audio data from one terminal of the plurality of terminals, the received audio data to the plurality of terminals other than the one terminal through the primary transfer paths;

receiving first key information for identifying a second terminal of the plurality of terminals from a first terminal of the plurality of terminals, the second terminal being different from the first terminal;

suppressing transfer of first audio data to the first terminal upon receiving the first audio data from a third terminal of the plurality of terminals, the third terminal being different from the first terminal, the third terminal being different from the second terminal;

storing key information for identifying the plurality of terminals in a storage unit in association with path information for identifying the respective primary transfer paths;

obtaining first path information for identifying a first transfer path of the primary transfer paths from the storage unit upon receiving the first key information, the first path information being associated with the first key information;

determining whether the first path information matches second path information for identifying a second transfer path of the primary transfer paths upon receiving the first audio data, the first audio data being received through the second transfer path; and suppressing transfer of the first audio data to the first terminal upon determining that the first path information does not match the second path information.

9. The audio data transfer method according to claim 8, further comprising:

generating secondary transfer paths for transmitting audio data between the computer and the first and second terminals, respectively, upon receiving the first key information;

performing individual communication of transferring audio data between the first terminal and the second terminal through the secondary transfer paths; and suppressing transfer of the first audio data to the first terminal through the primary transfer paths.

* * * * *